United States Patent
Tsukanaka et al.

(10) Patent No.: US 9,293,973 B2
(45) Date of Patent: Mar. 22, 2016

(54) POWER GENERATION DEVICE, TRANSMISSION DEVICE, SWITCHING DEVICE

(71) Applicant: OMRON CORPORATION, Kyoto-shi (JP)

(72) Inventors: Yohei Tsukanaka, Konan (JP); Satoru Nishimaki, Ritto (JP); Takeshi Miyasaka, Higashiomi (JP)

(73) Assignee: OMRON CORPORATION, Kyoto-Shi, Kyoto (JP)

( * ) Notice: Subject to any disclaimer, the term of this patent is extended or adjusted under 35 U.S.C. 154(b) by 347 days.

(21) Appl. No.: 14/141,420

(22) Filed: Dec. 26, 2013

(65) Prior Publication Data

US 2014/0210290 A1    Jul. 31, 2014

(30) Foreign Application Priority Data

Jan. 31, 2013   (JP) ................... 2013-017783

(51) Int. Cl.
H02K 5/00     (2006.01)
H02K 21/14    (2006.01)

(52) U.S. Cl.
CPC ...................... *H02K 21/14* (2013.01)

(58) Field of Classification Search
CPC ........... H02K 37/04; H02K 21/14; H01F 7/14
USPC ...................... 310/36, 91; 290/1 R
See application file for complete search history.

(56) References Cited

U.S. PATENT DOCUMENTS

| 7,710,227 B2 * | 5/2010 | Schmidt ............... H02K 35/04 310/168 |
| 8,148,856 B2 * | 4/2012 | Bataille ............... H02K 35/02 290/1 R |
| 2011/0285487 A1 | 11/2011 | Schmidt | |

* cited by examiner

*Primary Examiner* — Hanh Nguyen
(74) *Attorney, Agent, or Firm* — Shinjyu Global IP

(57) ABSTRACT

A power generation device including a rotation member rotatable by an operation force and a supporting member supporting the rotation member by attracting the rotation member with a magnetic force, the power generation device inducing a current to a coil by a magnetic flux of a magnet caused by rotation of the rotation member, and where, when the operation force is applied in a first state in which the rotation member is supported by the supporting member by being attracted to a first and second portions of the supporting member at respective first and second positions, the rotation member transitions to a second state by rotating with the first position of the supporting member as a first supporting point, and further transitions to a third state by rotating with a position of the supporting member different from the first position as a second supporting point.

20 Claims, 17 Drawing Sheets

POWER GENERATION DEVICE, TRANSMISSION DEVICE, SWITCHING DEVICE

CROSS REFERENCE TO RELATED APPLICATION

This application is related to and claims priority to Japanese Patent Application Number 2013-017783 filed on 31 Jan. 2013, where the contents of said application are herein incorporated by reference in their entirety.

BACKGROUND OF THE INVENTION

1. Technical Field

The present invention relates to a power generation device and the like for inducing current to a coil according to a principle of electromagnetic induction.

2. Related Art

A wide variety of applications is anticipated of a power generation device capable of generating power with a simple operation involved in daily performance. This is because the power generation device can operate small electric machinery and apparatus that requires instantaneous power for simple operation without a power source such as a battery. Therefore, the power generation device has been widely researched.

For example, US 2011/0285487 A (published Nov. 24, 2011) discloses an electromagnetic energy converter, including two electromagnetic members and an electric coil, for converting machine energy to electric energy. JP 2009-516802 W (published Apr. 23, 2009) discloses a self-power generation device including a magnetic circuit that passes through a central opening of an excitation coil for a plurality of times to form at least one loop.

A structure of a conventional power generation device shown in US 2011/0285487 A and JP 2009-516802 W will be described based on FIGS. 21A and 21B. FIGS. 21A and 21B show an internal structure of the conventional power generation device, where FIG. 21A is a cross-sectional view when the power generation device is in an initial state, and FIG. 21B is a cross-sectional view when the power generation device is in a final state.

As shown in FIG. 21A, a protrusion 18a and a protrusion 18b are respectively arranged in an extending manner on a spool 19a and a spool 19b with a central part C of an armature 11 interposed therebetween. The armature 11 is attracted at attracting positions $S_1$ and $S_2$ by the magnetic force of an end 13a of a yoke 12a and an end 13c of a yoke 12b. The armature 11 is thus supported in an orientation of diagonally passing through a space defined by the spool 19a and the spool 19b.

As shown in FIG. 21B, when a spring 14 is pushed down at an operation position W, the armature 11 rotates with the central part C as a supporting point. The direction of the magnetic flux of a permanent magnet changes so as to cooperatively operate with the rotation of the armature 11 and hence the magnetic flux passing through a coil 16 fluctuates, so that the power generation device can induce current to the relevant coil.

The conventional power generation device still has a problem in that the operation force that needs to be applied on the operation position W is significantly large as compared to the force exerted by the daily performance. In other words, the conventional power generation device lacks in usability since the user feels a sense of discomfort if a force larger than usual is necessary or the user needs to be conscious of strongly pushing in the spring 14.

A structural defect of the conventional power generation device causes the above problem. In other words, as shown in FIGS. 21A and 21B, the armature 11 always rotates with the central part C as the supporting point, and thus the conventional power generation device requires an operation force greater than the sum of the magnetic forces by the two ends (the end 13a and the end 13c in FIG. 21A, the end 13b and the end 13d in FIG. 21B). The sum of the magnetic forces is not large enough to cause problems in operating the armature 11 but is large enough to an extent of causing the problems described above.

The simplest method for solving the above problems is to advantageously apply the principle of leverage by extending the distance from the central part C to the operation position W. However, such a method is not a preferred method since it enlarges the power generation device and newly causes problems of stretching the operation stroke, and the like.

If a large operation force (or long operation stroke) is required for power generation under the condition of a constant power generation amount, this precisely means that the power generation efficiency is not satisfactory. The unsatisfactory power generation efficiency due to the structural defect may not be ignorable, not only in the application of causing the small electric machinery and apparatus to perform a simple operation, but also in other applications (e.g., application that requires continuous power generation of a certain extent, and the like).

BRIEF SUMMARY

The present invention has been made in view of solving the problems described above, and provides a power generation device and the like having higher power generation efficiency than the related art with a simple mechanism without enlarging the device or extending an operation stroke.

A power generation device is provided, including a rotation member configured to rotate by an externally applied operation force, and a supporting member configured to support the rotation member by attracting the rotation member with a magnetic force exerted at a predetermined portion of the rotation member, where the power generation device configured to induce a current to a coil by causing a magnetic flux of a permanent magnet passing through the coil to fluctuate in cooperation with the rotation of the rotation member, and where when the operation force is applied in a first state in which the rotation member is supported by the supporting member by being attracted to a first portion and to a second portion of the supporting member at a respective first position and a second position of the supporting member, the rotation member transitions to a second state by rotating with the first position of the supporting member as a first supporting point, and further transitions to a third state by rotating with a position of the supporting member different from the first position as a second supporting point.

Therefore, the power generation device according to one aspect of the present invention has an effect of being able to generate power at higher power generation efficiency than in the related art with a simple mechanism without enlarging the device or extending the operation stroke.

BRIEF DESCRIPTION OF THE DRAWINGS

FIG. 5A shows a first assembly process, FIG. 5B shows a second assembly process, FIG. 5C shows a third assembly process, and FIG. 5D shows an outer appearance of the power generation device in which the assembly is completed;

FIG. 14A is a cross-sectional view showing a case where a rectangular protrusion is arranged on each spool; FIG. 14B is a cross-sectional view showing a case where only the rectangular protrusion is arranged on the spool; and FIG. 14C is a cross-sectional view showing a case where a protrusion with smoothened edge is arranged on the spool;

FIG. 15A is a cross-sectional view showing a state in which the elastic member supports the shaft; FIG. 15B is a bird's eye view of the power generation device; and FIG. 15C is a schematic view showing a structure of the spool;

FIG. 16A is a cross-sectional view showing a structure in which the protrusion is arranged only on a lower side of the armature, and FIG. 16B is a cross-sectional view showing a structure in which the protrusions are respectively arranged on both sides of the armature;

FIG. 18A is a cross-sectional view showing an internal structure of the power generation device when the power generation device is in the first state, and FIG. 18B is a cross-sectional view showing an internal structure of the power generation device when the power generation device is in the fourth state;

FIG. 19A is a circuit diagram showing a connection of a capacitor to the power generation device, and FIG. 19B is a circuit diagram showing a connection of the capacitor and a transmission device to the power generation device;

FIG. 20A is a schematic view showing a switch including the power generation device, the capacitor, and the transmission device, and FIG. 20B is a schematic view showing a usage scene of the switch; FIG. 21A is a cross-sectional view when the power generation device is in an initial state, and FIG. 21B is a cross-sectional view when the power generation device is in a final state.

DETAILED DESCRIPTION

One embodiment of the present invention will be described in detail based on FIGS. 1 to 20B.

[Configuration of Power Generation Device 10]

Figure 1:
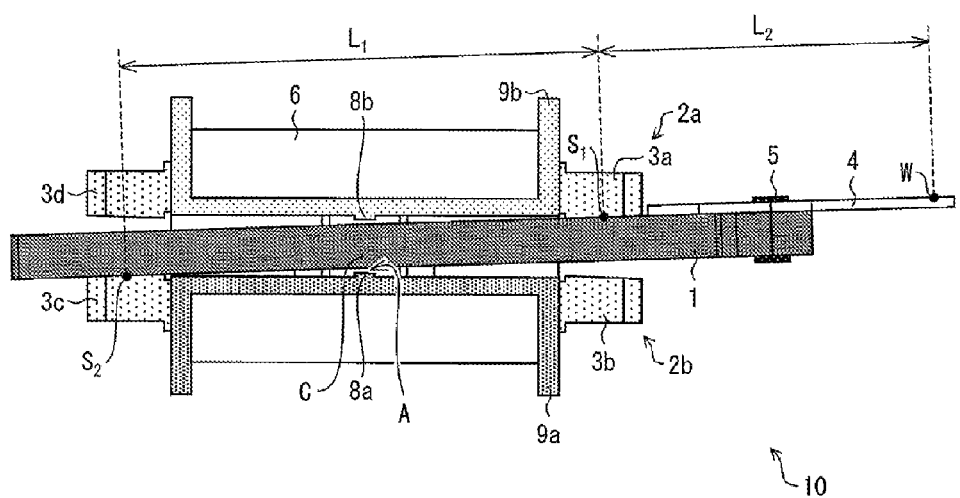
FIG. 1 is a cross-sectional view showing an internal structure of a power generation device according to one embodiment of the present invention when the power generation device is in a first state.

The configuration of a power generation device 10 will be described based on FIG. 1. FIG. 1 is a cross-sectional view showing an internal structure of the power generation device when the power generation device 10 is in a first state. The relationship of the entire power generation device 10 and the cross-section shown in FIG. 1 will be described below with reference to FIG. 5D.

The power generation device 10 is a device that fluctuates the magnetic flux of a permanent magnet 7 (not shown in the cross-section of FIG. 1, see FIG. 5B) passing through a coil 6 so as to cooperatively operate with rotation of an armature 1 to induce current to the coil. The power generation device 10 includes the armature 1, a yoke 2a, a yoke 2b, a spring 4, the coil 6, the permanent magnet 7, a spool 9a, and a spool 9b.

The armature (rotation member) 1 is a member having a double hook shape (i.e., a shape in which two small plate-like members of the same shape are added to the side surface of a plate-like member so that both ends of the plate-like member have a substantially right angle hook shape), where long side portions of the double hook shape are mounted on the spool 9a. The spool 9b is placed so as to cover the long side portions, and the spool 9a and the spool 9b are fitted from top and bottom to form a cuboid portion E configured by covering the long side portions, where the cuboid portion is hereinafter referred to as "bobbin". Therefore, the widths of the spool 9a and the spool 9b are substantially the same as the lengths of the long side portions, and the hook shaped portions of the armature 1 are extended from the bobbin so that a portion curved to a substantially right angle is exposed.

The coil 6 is a member for retrieving current (electric energy) from a fluctuating magnetic field. The coil 6 is mounted on the spool 9b so as to cover the bobbin. A predetermined device (e.g., wireless device or the like, described in detail below) that uses the induced current is connected to both ends of the coil 6 by way of an electric circuit.

The spring 4 is fixed to one hook shaped portion of the armature 1 by a fixing pin 5. Therefore, the armature 1 operates inside the bobbin when an arbitrary operation position W in the spring 4 is pushed. The process in which the armature 1 operates will be described in detail below with reference to FIGS. 1 to 4 which illustrates a series of cross-sectional views showing the process of the relevant operation.

The yoke (supporting member) 2a and the yoke (supporting member) 2b are plate-like members. As will be described below, the yokes are formed by using a soft magnetic material, and thus the yoke 2a and the yoke 2b themselves have properties of a magnet. Hereinafter, both ends of the yoke 2a are referred to as an end (second portion) 3a and an end (fourth portion) 3d, and both ends of the yoke 2b are referred to as an end (third portion) 3b and an end (first portion) 3c. The yoke 2b and the spool (fixing member) 9a are fitted from top and bottom with the yoke 2b on the bottom and the spool (fixing member) 9a on the top. A short circular column shaped protrusion is formed substantially at the middle of the yoke 2b, and the permanent magnet is mounted on the yoke 2b with the protrusion fitted into a central part (referring to a hollow hole, the diameter of the hole being substantially the same as the diameter of the protrusion) of the doughnut-shaped (i.e., a shape in which the central part of the circular column is made hollow) permanent magnet 7.

A similar protrusion is also arranged substantially at the middle of the yoke 2a. The yoke 2a is mounted on the spool 9a with the protrusion fitted into the central part of the permanent magnet 7 from above so as to sandwich the permanent magnet 7 with the yoke 2a and the yoke 2b. In other words, the permanent magnet 7 is sandwiched by the two yokes from the top and the bottom with the central part fixed by the protrusions respectively arranged in the yoke 2a and the yoke 2b, and the three sides surrounded by the bobbin and the two hook-shaped portions of the armature 1. The permanent magnet 7 is therefore not shown in the cross-sectional view of FIG. 1.

Both ends of the yoke 2a and the yoke 2b are extended from the spool 9a, and are positioned to sandwich the ends of the hook shaped portions of the armature 1 from the top and bottom. A spacing (substantially equal to the thickness of the permanent magnet 7) between the yoke 2a and the yoke 2b is greater than the thickness of the armature 1, and thus the ends of the hook shaped portions of the armature 1 are not sandwiched by the ends of the yokes.

The magnetic force by the ends 3a to 3d of the yoke 2a and the yoke 2b act to attract the ends of the hook shaped portions of the armature 1. Inside the bobbin, a protrusion 8a and a protrusion 8b are arranged in an extending manner on the spool 9a and the spool 9b in the width direction of the long side portions of the double hook shape of the armature 1. Thus, the armature 1 is inhibited from being attracted to both ends of one yoke, whereby the armature 1 is constantly supported in an orientation of diagonally passing through the interior of the bobbin by the magnetic force of the ends positioned diagonally with respect to each other with the armature 1 therebetween.

As shown in FIG. 1, a state in which the armature 1 is supported inside the bobbin in the above orientation is hereinafter referred to as a "first state". The protrusion 8b merely prevents the armature 1 from being attracted to the end 3a and the end 3d of the yoke 2a, and is not directly related to the operation of the armature 1 to be described below. Therefore, the protrusion 8b may not be arranged in an extending manner on the spool 9b.

Furthermore, the surfaces of the respective ends where the ends 3a to 3d make contact with the armature 1 have an angle substantially equal to an angle formed by the orientation of the armature 1 with respect to the surface of the interior of the bobbin. Thus, the respective ends and the armature 1 make contact at the surface and the armature 1 does not make contact with the respective ends at the corner of the respective ends. Here, the center of a surface where the armature 1 is attracted to the end 3a is an attracting position (second position) $S_1$, the center of a surface where the armature 1 is attracted to the end 3c is an attracting position (first position) $S_2$, the center of a surface where the armature 1 is attracted to the end 3b is an attracting position (third position) $S_3$, and the center of a surface where the armature 1 is attracted to the end 3d is an attracting position (fourth position) $S_4$ (see FIG. 4).

In the first state, the armature 1 and the protrusion 8a do not come into contact with each other, and thus a space (hereinafter referred to as "clearance A") is formed between the armature 1 and the protrusion 8a from the distal end of the protrusion 8a to the surface of the armature 1 in a perpendicularly upward direction. Therefore, when the spring 4 is pushed down at an arbitrary operation position W, the armature 1 starts to rotate in a direction such that the armature 1 approaches the end 3b from the end 3a, with the attracting position 32 as the supporting point, not the protrusion 8a. In other words, as opposed to the conventional structure (see FIGS. 21A and 21B) in which the clearance A does not exist and the armature constantly rotates with the central part of the armature as the supporting point, the central part C of the armature 1 rotates with the operation position W.

Thus, an operation force greater than the sum of the magnetic forces by the two ends is not necessary as in the conventional power generation device, and an operation force greater than the respective magnetic forces merely needs to be exerted (with time difference) in the power generation device 10. In this case, a distance $(L_1+L_2)$ from the attracting position $S_2$ (supporting point) to the operation position W (force point) is longer than a distance $(L_1/2+L_2)$ from the central part C to the operation position W. Thus, the operation force acts on the attracting position $S_1$ (acting point) in a state where the principle of leverage is acting more advantageously than in the conventional power generation device.

Therefore, the power generation device 10 can generate power with a smaller operation force than the operation force required in the conventional power generation device with a simple mechanism without enlarging the device or extending the operation stroke. Since the power generation device 10 can generate power of the same amount as the power that can be generated by the conventional power generation device, the power generation device 10 capable of generating power with smaller operation force than the related art can generate power at higher power generation efficiency than the conventional power generation device.

Dimension and Material of Each Configuration

The armature 1 is made using a soft magnetic material such as permalloy, pure iron (e.g., SUY-0), and the like. In the present embodiment, the armature 1 has a dimension of 8 mm vertically, 20 mm horizontally, and 1.4 mm in thickness. However, such dimension is merely illustrative for the sake of explanation, and can be arbitrarily changed depending on the dimension of the power generation device 10.

The yoke 2a and the yoke 2b are made using a soft magnetic material such as permalloy, pure iron (e.g., SUY-0), and the like. In the present embodiment, the distance in the perpendicular direction (distance in the vertical direction in the cross-sectional view shown in FIG. 1) from the attracting position $S_1$ to the attracting position $S_2$ is 2.0 mm so that the movable angle of the armature 1 (i.e., the angle formed by the orientation of the armature 1 diagonally passing through the interior of the bobbin with respect to the surface of the interior of the bobbin) becomes about 3.2°, and thus the spacing between the yoke 2a and the yoke 2b is obtained in accordance with the distance in the perpendicular direction. However, similar to the dimension of the armature 1, the movable angle and the spacing are both arbitrarily changeable. In the present embodiment, the yoke 2a, the yoke 2b, and the spring 4 respectively have appropriate dimensions such that the distance $L_1$ from the attracting position $S_1$ to the attracting position $S_2$ becomes 15 mm, and the distance $L_2$ from the attracting position $S_1$ to the operation position W becomes 10 mm.

The spring 4 is made using a non-magnetic material such as stainless steel (SUS). The elasticity of the spring 4 facilitates the rotation of the armature 1. This is because when the armature 1 starts to rotate away from the attraction of the end 3a, the stress of the spring 4 accelerates the rotation of the armature.

The spool 9 is made using resin such as polycarbonate (PC), polybutylene terephthalate (PBT), ABS (collective term of Acrylonitrile, Butadiene, Styrene copolymer synthetic resin) or a non-magnetic metal such as copper. If the armature 1 has the dimension of one example described above, the spacing between the spool 9a and the spool 9b is set to 2.0 mm so that the size of the clearance A becomes 0.2 mm. However, the spacing can be arbitrarily changed, similar to the dimension of the armature 1.

If the armature 1 has the dimension of one example described above, the height of the protrusion 8a may be 0.2 mm, for example.

Operation of Power Generation Device 10

The process in which the power generation device 10 operates will be described based on FIGS. 1 to 4. As described with reference to FIG. 1, if the power generation device 10 is in the first state, the armature 1 starts to rotate with the attracting position (first position) $S_2$ as the supporting point (first supporting point) when the spring 4 is pushed down at the arbitrary operation position W. This is because in the first state, the armature 1 and the protrusion 8a are not in contact with each other such that the clearance A exists, and the central part C accordingly rotates with the operation position W.

Figure 2:
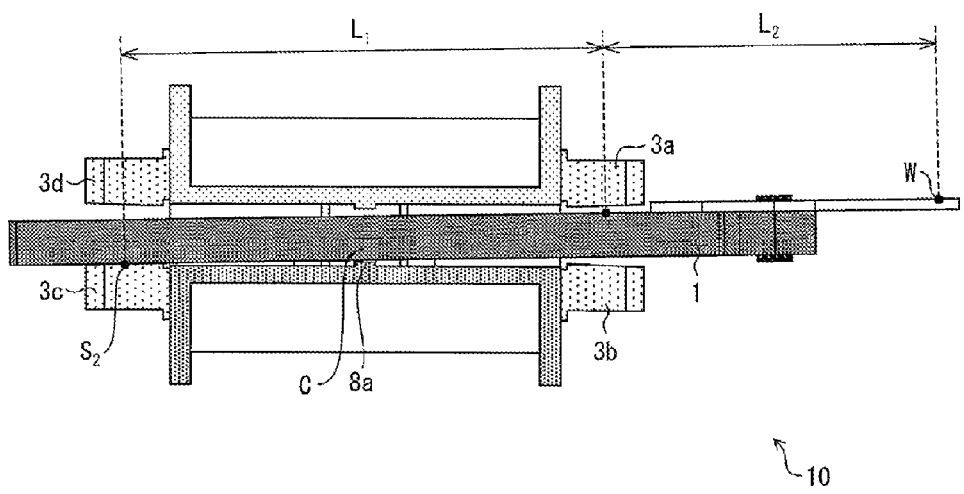
FIG. 2 is a cross-sectional view showing the internal structure of the power generation device when the power generation device is in a second state.

FIG. 2 is a cross-sectional view showing an internal structure of the power generation device when the power generation device 10 is in a second state. As shown in FIG. 2, when the operation force applied on the operation position W becomes greater than the magnetic force fixing the armature 1, and the armature 1 rotates away from the end 3a, the armature makes contact with the protrusion 8a at the central part C. Thus, the armature 1 starts to rotate with the protrusion 8a as the supporting point (i.e., the second supporting point). The state shown in FIG. 2 is hereinafter referred to as "second state".

Figure 3:
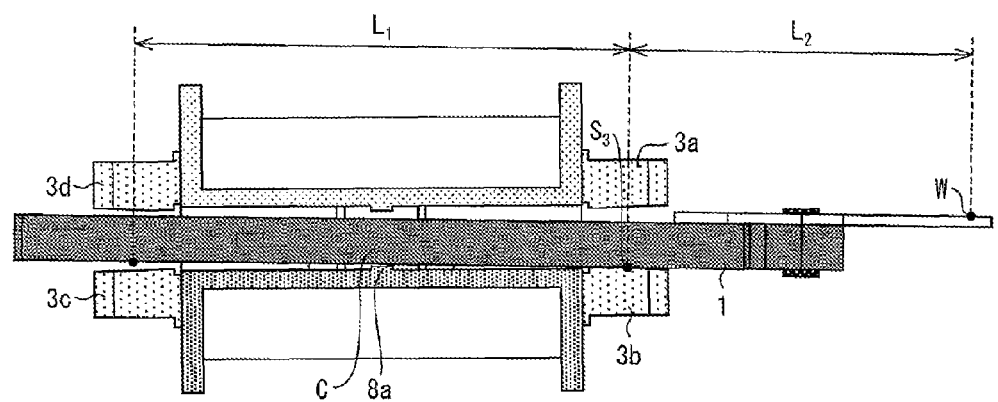
FIG. 3 is a cross-sectional view showing the internal structure of the power generation device when the power generation device is in a third state.

FIG. 3 is a cross-sectional view showing an internal structure of the power generation device when the power generation device 10 is in a third state. As shown in FIG. 3, when the armature 1 is further rotated from the second state, the armature is attracted to the end 3b at the attracting position $S_3$. When the force for rotating the armature 1 becomes greater than the magnetic force by the end 3c, the armature separates away from the end 3c and further rotates. The state shown in FIG. 3 is hereinafter referred to as the "third state".

Figure 4:
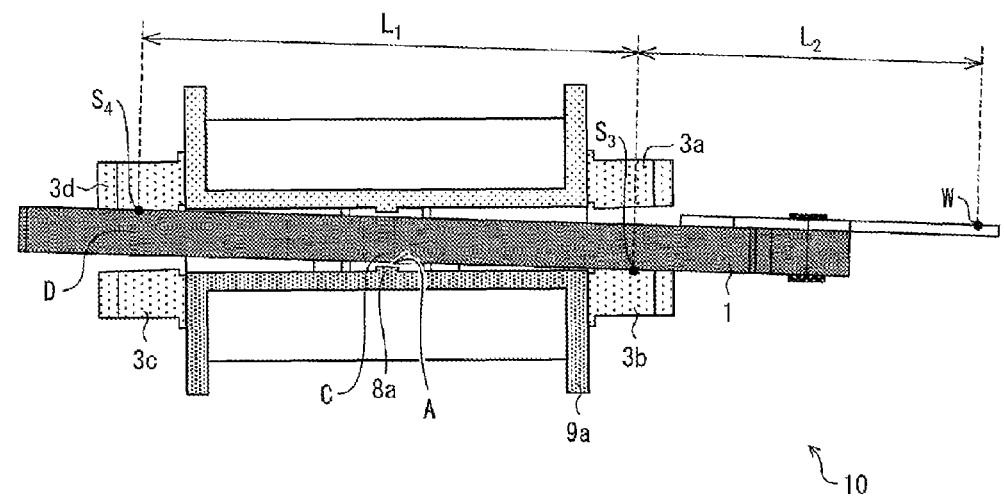
FIG. 4 is a cross-sectional view showing the internal structure of the power generation device when the power generation device is in a fourth state.

FIG. 4 is a cross-sectional view showing an internal structure of the power generation device when the power generation device 10 is in a fourth state. As shown in FIG. 4, when the armature 1 further rotates from the third state, the armature 1 separates away from the protrusion 8a (clearance A is formed) and rotates with the attracting position $S_3$ as the supporting point by the inertia caused by the rotation, the magnetic force by the end 3d, and the operation force applied on the operation position W. In other words, the central part C rotates with a left end portion D of the armature 1. Finally, the armature 1 is attracted to the end 3d at the attracting position $S_4$. Thus, the armature 1 is supported in an orientation of passing through the bobbin diagonally opposite to the first state. The state shown in FIG. 4 is hereinafter referred to as the "fourth state".

As described above with reference to FIGS. 1 to 4, due to the existence of the clearance A, the supporting point of the rotation is interchanged between the attracting position $S_2$ or $S_3$ and the protrusion 8a in the process of the operation, and the power generation device 10 transitions from the first state to the fourth state. Accompanied therewith, the magnetic flux of the permanent magnet 7 fluctuates, and the power generation device can induce current to the coil 6.

Above, description is provided in which the power generation device 10 transitions from the first state to the fourth state through the second state and third state. On the other hand, the power generation device 10 can transition from the fourth state to the first state through the second state and the third state. In this case as well, due to the existence of the clearance A, the supporting point of the rotation is interchanged between the attracting position $S_2$ or $S_3$ and the protrusion 8a in the process of the operation, similar to above. It should be noted that, when transition is made from the fourth state to the first state, the process of the operation changes according to the position of acting the operation force. For example, if the operation force is applied upward on the operation position W, the supporting point of the rotation is interchanged between the attracting position $S_2$ or $S_3$ and the protrusion 8b (not the protrusion 8a) in the process of the operation. Thus, even when the transition is made from the fourth state to the first state, the power generation device 10 has the effect of being able to generate power at higher power generation efficiency than the conventional power generation device, similar to when the transition is made from the first state to the fourth state.

Outer Appearance and Assembly Process of Power Generation Device 10

Figure 5A:
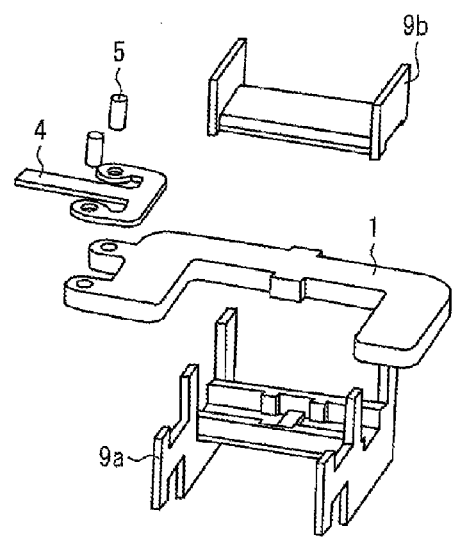
FIGS. 5A to 5D are exploded perspective views each showing, in a step-wise manner, an assembly process of the power generation device, where
Figure 5B:
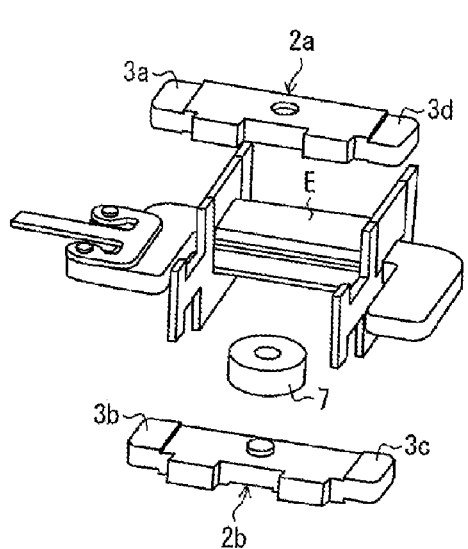
Figure 5C:
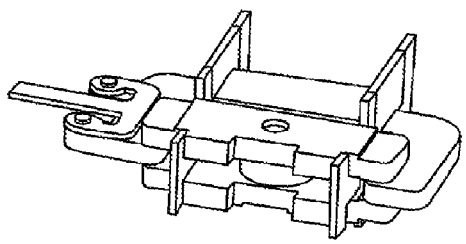
Figure 5D:
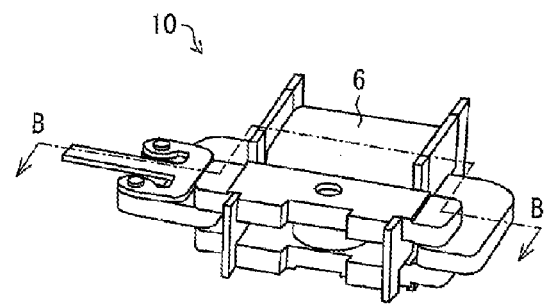

The outer appearance and the assembly process of the power generation device 10 will be described based on FIGS. 5A to 5D. FIGS. 5A to 5D are exploded perspective views each showing, in a step-wise manner, an assembly process of the power generation device 10, where FIG. 5A shows a first assembly process, FIG. 5B shows a second assembly process, FIG. 5C shows a third assembly process, and FIG. 5D shows an outer appearance of the power generation device 10 in which the assembly is completed. FIGS. 1 to 4 described above correspond to the cross-sectional views taken along line B-B in FIG. 5D.

The power generation device 10 is assembled as shown in FIGS. 5A to 5D. In other words, in the first assembly process, the spring 4 is fixed to the armature 1 by the fixing pin 5, the long side portion of the armature is mounted on the spool 9a, and the spool 9a and the spool 9b are fitted from the top and bottom (see FIG. 5A). Then, in the second assembly process, the permanent magnet 7 is mounted on the yoke 2b, the yoke 2b and spool 9a are fitted from the top and bottom, and the yoke 2a is mounted on the spool 9a (see FIGS. 5B and 5C). Lastly, in the third assembly process, the coil 6 is mounted on the spool 9b (see FIG. 5D).

As described above, the permanent magnet 7 is fixed while being sandwiched by the yoke 2a and the yoke 2b. The magnetic flux of the permanent magnet 7 is generated in the clockwise direction in the first state, and the magnetic flux is generated in the counterclockwise direction in the fourth state. In other words, the magnetic flux of the permanent magnet 7 fluctuates by the transition from the first state to the fourth state. Notably, the magnetic flux fluctuates between the first state and the fourth state, regardless of the rotating direction. Therefore, the power generation device 10 can induce current to the coil 6 by the rotation of the armature 1.

Figure 6:
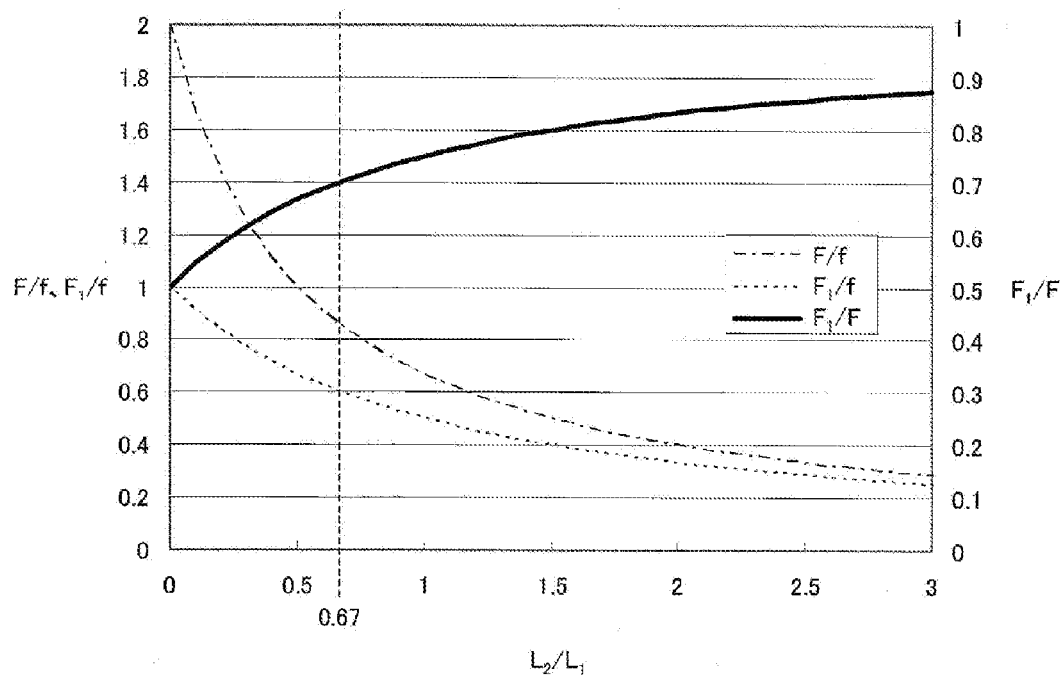
FIG. 6 is a graph showing the result of comparing an operation force F and an operation force $F_1$ under an arbitrary condition.

Comparison Between Operation Force F and Each of Operation Forces $F_1$, $F_2$, and $F_3$ As described herein below with reference to FIG. 6, the operation force $F_1$ for making the power generation device 10 transition from the first state to the second state is smaller than the operation force F required in the conventional power generation device. FIG. 6 is a graph showing the result of comparing the operation force F and the operation force $F_1$ under an arbitrary condition. The horizontal axis of the graph represents a ratio of the distance $L_2$ from the attracting position $S_1$ to the operation position W with respect to the distance $L_1$ from the attracting position $S_1$ to the attracting position $S_2$. The left vertical axis of the graph represents a ratio of the operation force F and the operation force $F_1$ with respect to the magnetic force f by the end 3, and the right vertical axis represents a ratio of the operation force $F_1$ with respect to the operation force F.

Figure 21A:
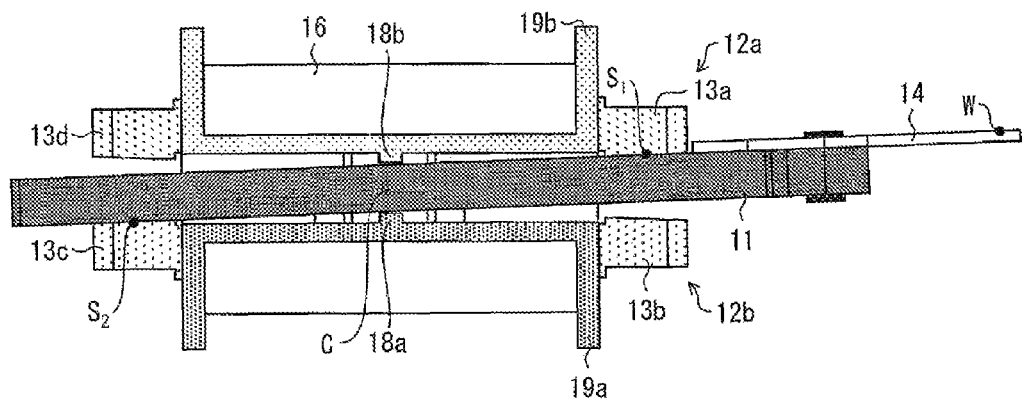
FIGS. 21A and 21B show an internal structure of a conventional power generation device, where
Figure 21B:
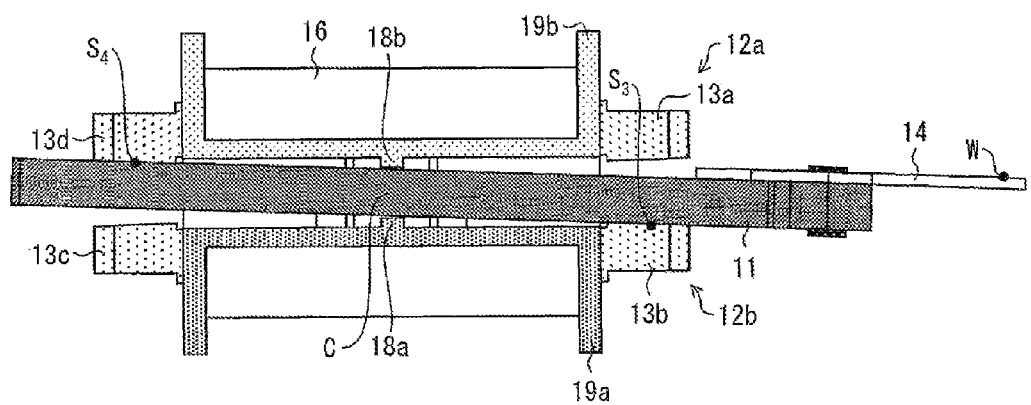

As described above, in the conventional power generation device of FIGS. 21A and 21B, an operation force is required that is greater than the sum of the magnetic forces of the respective ends 13a and 13c and the ends 13b and 13d. Accordingly, the operation force F is expressed by the following equation.

$$F = \frac{2L_1}{L_1 + 2L_2} f \quad \text{[Equation 1]}$$

The power generation device 10 in the first state (see FIG. 1) merely requires the operation force of separating the armature 1 from the end 3a, and thus the operation force $F_1$ is expressed by the following equation.

$$F_1 = \frac{L_1}{L_1 + L_2} f \quad \text{[Equation 2]}$$

Therefore, the ratio of the operation force $F_1$ to the operation force F is expressed by the following equation.

$$\frac{F_1}{F} = 1 - \frac{1}{2} \cdot \frac{L_1}{L_1 + L_2} < 1 \quad \text{[Equation 3]}$$

As shown on the right vertical axis of FIG. 6 and the above equation, the ratio of the operation force $F_1$ with respect to the operation force F is always smaller than 1. In other words, $F_1 < F$ is met under the arbitrary condition. As shown on the left vertical axis of FIG. 6, the ratio of the operation force F and the operation force $F_1$ with respect to the magnetic force f by the end 3 is always smaller for the operation force $F_1$. As described above, since the distance $L_1$ is 15 mm and the distance $L_2$ is 10 mm in the present embodiment, the ratio shown on the horizontal axis becomes 10/15≈0.67 (shown with a dotted line in FIG. 6). Since the value of the right vertical axis in this case is 0.7, the power generation device 10 in the first state can operate the armature 1 with the operation force of about 70 percent of that in the related art.

Figure 7:
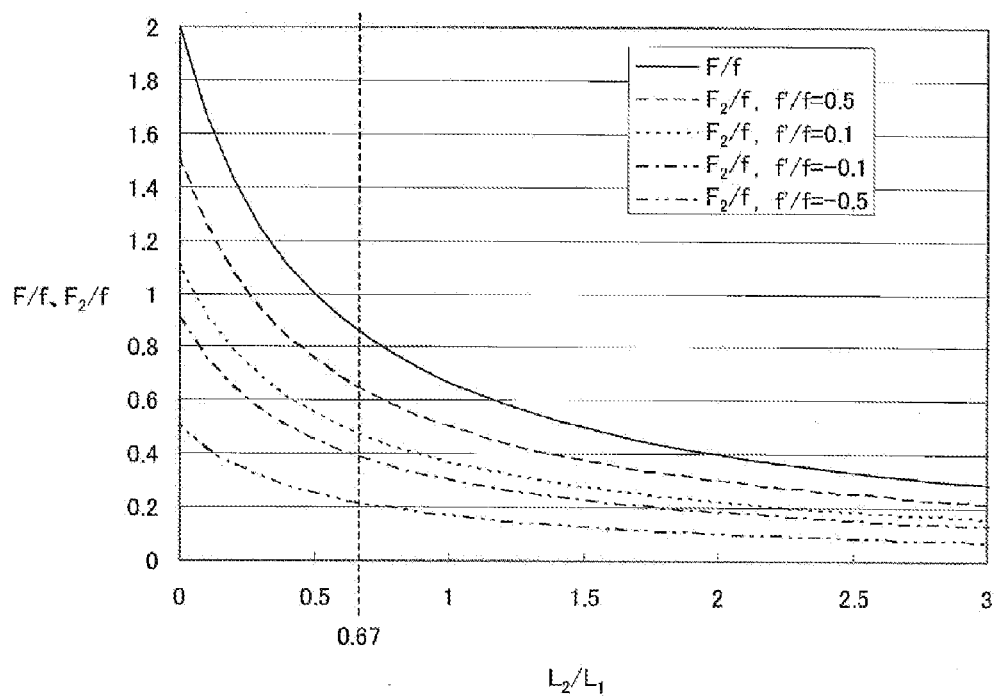
FIG. 7 is a graph showing the result of comparing the operation force F and an operation force $F_2$ under an arbitrary condition.

As now discussed with respect to FIG. 7, the operation force $F_2$ for making the power generation device 10 transition from the second state to the third state is smaller than the operation force F required in the conventional power generation device. FIG. 7 is a graph showing the result of comparing the operation force F and the operation force $F_2$ under an arbitrary condition. The horizontal axis of the graph represents a ratio of the distance $L_2$ with respect to the distance $L_1$. The vertical axis of the graph represents a ratio of the operation force F and the operation force $F_2$ with respect to the magnetic force f by the end 3 when the ratio of the magnetic force f' (referring to magnetic force exerted by the end 3 when the armature 1 is not in contact with the end 3.

To further rotate the armature 1 with the protrusion 8a as the supporting point, the power generation device 10 in the second state (see FIG. 2) requires the operation force of separating the armature 1 from the end 3c, and thus the operation force $F_2$ is expressed by the following equation.

$$F_2 = \frac{L_1}{L_1 + 2L_2}(f + f') \quad \text{[Equation 4]}$$

Therefore, the ratio of the operation force $F_2$ with respect to the operation force F is expressed by the following equation.

$$\frac{F_2}{F} = \frac{f + f'}{2f} < 1 \quad \text{[Equation 5]}$$

As shown on the vertical axis of FIG. 7, the ratio of the operation force $F_2$ with respect to the magnetic force f by the end 3 is smaller than the ratio of the operation force F regardless of the ratio of the magnetic force f' with respect to the magnetic force f. Therefore, as expressed by the above equation, the ratio of the operation force $F_2$ with respect to the operation force F is always smaller than 1. In other words, $F_2 < F$ is met under the arbitrary condition. Furthermore, since the value of the vertical axis ($F_2/f$, f'/f=−0.1) is 0.39 when the ratio represented by the horizontal axis is 0.67, the power generation device 10 in the second state can operate the armature 1 with an operation force smaller than or equal to half of that in the related art (F/f=0.85).

Figure 8:
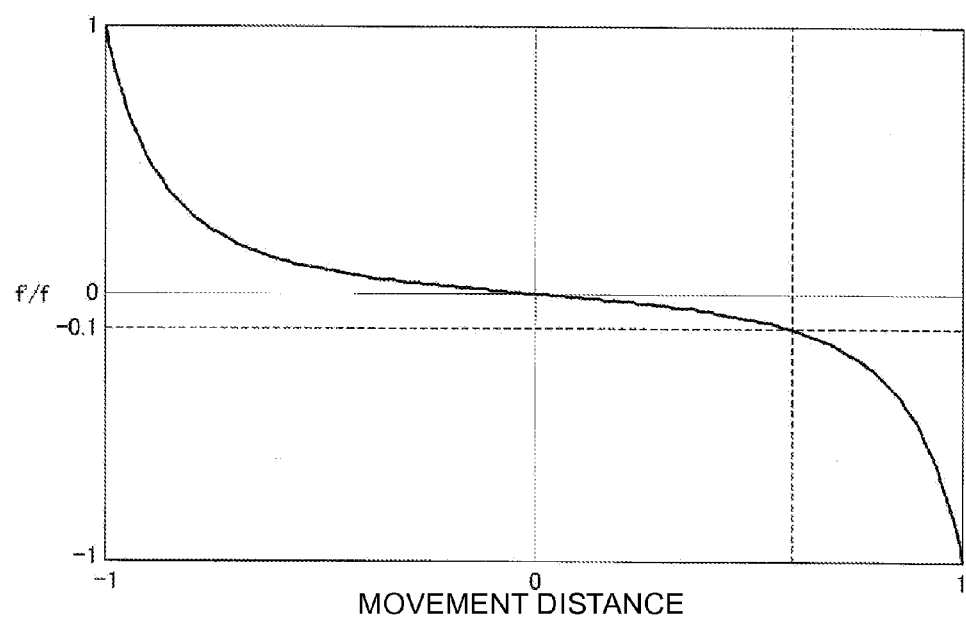
FIG. 8 is a graph showing the change in a ratio of a magnetic force f' with respect to a magnetic force f of an arbitrary position between the ends facing each other.

The influence of the magnetic force by the pairs of ends (3a and 3b, and 3c and 3d) facing each other will be described based on FIG. 8. FIG. 8 is a graph showing the change in the ratio of the magnetic force f' with respect to the magnetic force f of an arbitrary position from the end 3a to the end 3b (or from the end 3c to the end 3d). The horizontal axis of the graph represents the value in which the movement distance from the end 3a to the end 3b (or from the end 3c to the end 3d) is normalized to a range from −1 to 1. In other words, the position of the attracting position $S_1$ corresponds to −1, the intermediate position between the attracting position $S_1$ and the attracting position $S_3$ corresponds to 0, and the position of the attracting position $S_3$ corresponds to 1.

FIG. 8 shows most clearly that the magnetic force by one end (the end 3a or the end 3d) becomes weaker, and at the same time, the magnetic force by the other end (the end 3b or the end 3c) becomes stronger as the armature 1 separates from one attracting position (attracting position $S_1$ or attracting position $S_2$) and approaches the other attracting position (attracting position $S_3$ or attracting position $S_4$) as the movement distance shown by the horizontal axis increases. In other words, at the position of the attracting position $S_1$ when the movement distance is −1, the magnetic force f' is equal to the magnetic force f where ratio of the magnetic force f' with respect to the magnetic force f is 1.

The influence of the magnetic force f' non-linearly attenuates and becomes zero at the intermediate position between the attracting position $S_1$ and the attracting position $S_3$, where magnetic forces by the opposing ends are balanced, as the armature 1 separates from the attracting position $S_1$ and approaches the attracting position $S_3$ when the movement distance increases. Furthermore, the influence of the magnetic force f' by the end 3a further non-linearly attenuates, where influence of the magnetic force f' by the end 3b further non-linearly increases, as the armature 1 separates from the attracting position $S_1$ and approaches the attracting position $S_3$. At the position of the attracting position $S_3$ when the movement distance is one, the absolute value of the magnetic force f' becomes equal to the magnetic force f where the ratio of the magnetic force f' with respect to the magnetic force f is −1.

In the above description of FIG. 7, the reason for focusing on the ratio of the operation force $F_2$ with respect to the magnetic force f by the end 3 in f'/f=−0.1 (position shown with a horizontal dotted line in FIG. 8) is that the armature 1 normally separates from the end 3c (i.e., critical point of the second state and the third state) at the position where the movement distance becomes about 0.6 (position shown with a vertical dotted line in FIG. 8).

Figure 9A:
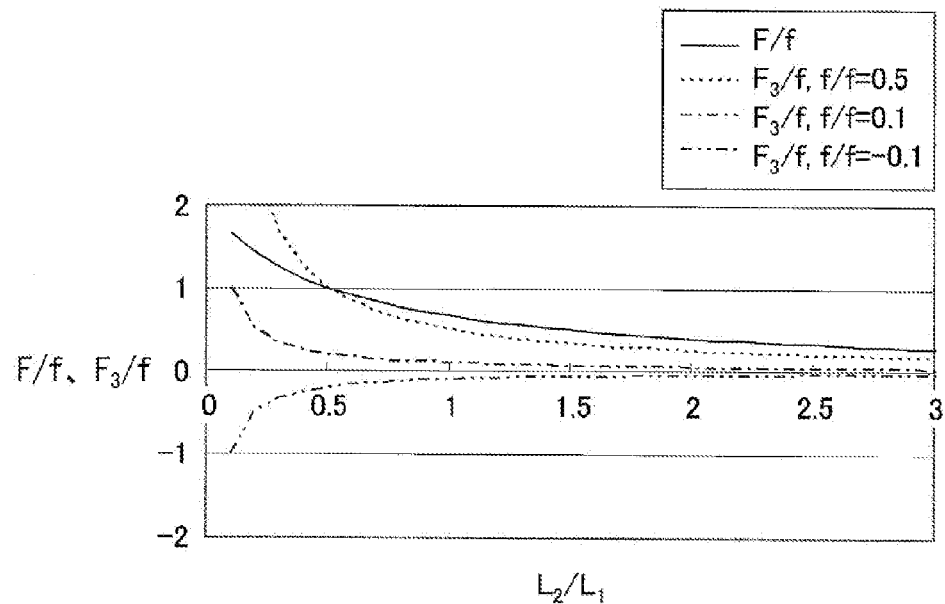
FIG. 9A is graph showing the result of comparing the operation force F and an operation force $F_3$ under an arbitrary condition.
Figure 9B:
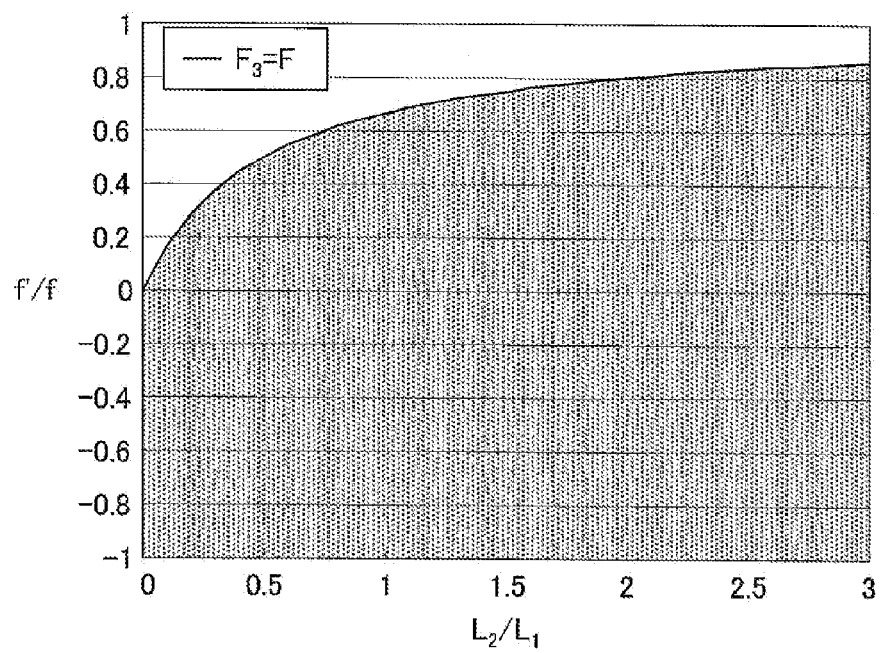
FIG. 9B is a graph showing the condition in which the operation force $F_3$ becomes smaller than the operation force F.

As now discussed with regard to FIGS. 9A and 9B, the operation force $F_3$ for transitioning the power generation device 10 from the third state to fourth state is smaller than the operation force F required in the conventional power generation device. FIG. 9A is graph showing the result of comparing the operation force F and the operation force $F_3$ under an arbitrary condition, and FIG. 9B is a graph showing the condition in which the operation force $F_3$ becomes smaller than the operation force F. The horizontal axes of both graphs represent the ratio of the distance $L_2$ with respect to the distance $L_1$. The vertical axis of the graph of FIG. 9A represents the ratio of the operation force F and the operation force $F_2$ with respect to the magnetic force f by the end 3 when the ratio of the magnetic force f' with respect to the magnetic force f (see FIG. 8) takes each value, and the vertical axis of the graph of FIG. 9B represents the ratio of the magnetic force f' with respect to the magnetic force f.

To further rotate the armature 1 with the protrusion 8a as the supporting point, the operation force $F_3$ required by the power generation device 10 in the third state (see FIG. 3) is expressed by the following equation.

$$F_3 = \frac{L_1}{L_2} f' \quad \text{[Equation 6]}$$

Therefore, the ratio of the operation force $F_3$ with respect to the operation force F is expressed by the following equation.

$$\frac{F_3}{F} = \frac{L_1 + 2L_2}{2L_2} \cdot \frac{f'}{f} \quad \text{[Equation 7]}$$

As shown in FIG. 9A, the ratio of the operation force $F_3$ with respect to the magnetic force f by the end 3 is smaller than the ratio of the operation force F ($F_3$<F is met) under a weak condition. The weak condition for satisfying $F_3$<F is expressed by the following inequality.

$$\frac{f'}{f} < \frac{2L_2}{L_1 + 2L_2} \quad \text{[Equation 8]}$$

FIG. 9B shows a range satisfying the above inequality, the lower side portion of the curve indicating $F_3$=F. The specification of the power generation device 10 is preferably determined so as to fall within the range shown in FIG. 9B. In the actual design, the condition of the specification is not strict. This is because (1) the design in which the distance $L_2$ becomes shorter than half the distance $L_1$ is a design that is rarely carried out; (2) the ratio of the magnetic force f' with respect to the magnetic force f becomes 0.5 limiting to a very special condition in which the armature 1 is in close contact with the end 3 (see FIG. 8), (3) the armature 1 that reached the intermediate position has kinetic momentum and the inertia of rotation acts, so that actually, the operation force smaller than the operation force $F_3$ expressed by the above equation is enough.

For example, since the value of the vertical axis ($F_3$/f, f'/f=0.1) is 0.2 when the ratio represented by the horizontal axis becomes 0.67, the power generation device 10 in the third state can operate the armature 1 with the operation force of about 20 percent of that in the related art (F/f=0.85).

Therefore, the operation force greater than the sum of the magnetic forces by the two ends is not required all at once as in the conventional power generation device. In other words, the operation force greater than the magnetic forces by the respective ends merely needs to be exerted in order (with time difference) in the power generation device 10. In this case, since the distance from the attracting position $S_2$ to the operation position W is longer than the distance from the central part C to the operation position W, the operation force acts on the attracting position $S_1$ (acting point) with the principle of leverage acting more advantageously than in the conventional power generation device.

Therefore, the power generation device 10 can generate power with the operation force smaller than the operation force required in the conventional power generation device with a simple mechanism without enlarging the device or extending the operation stroke. Since the power generation device 10 can generate power of the same amount as the power that can be generated by the conventional power generation device, the power generation device 10 capable of generating power with the operation force smaller than the related art can generate power at higher power generation efficiency than the conventional power generation device.

Comparison of Operation Force $F_1$ and $F_2$, and $F_3$

Figure 10A:
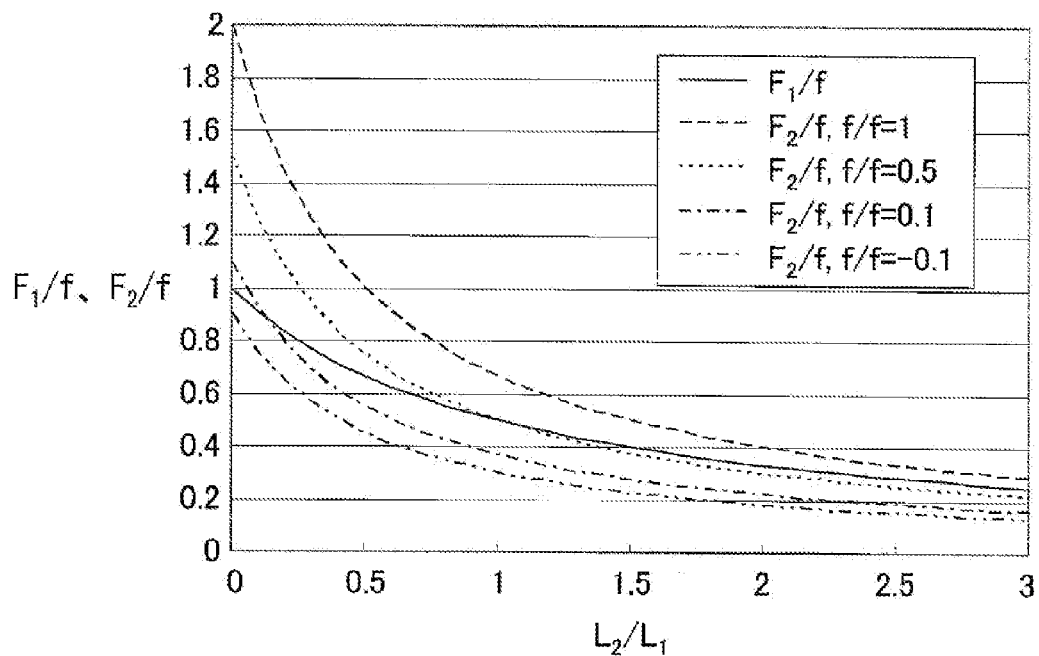
FIG. 10A is a graph showing the result of comparing the operation force $F_1$ and the operation force $F_2$ under an arbitrary condition.
Figure 10B:
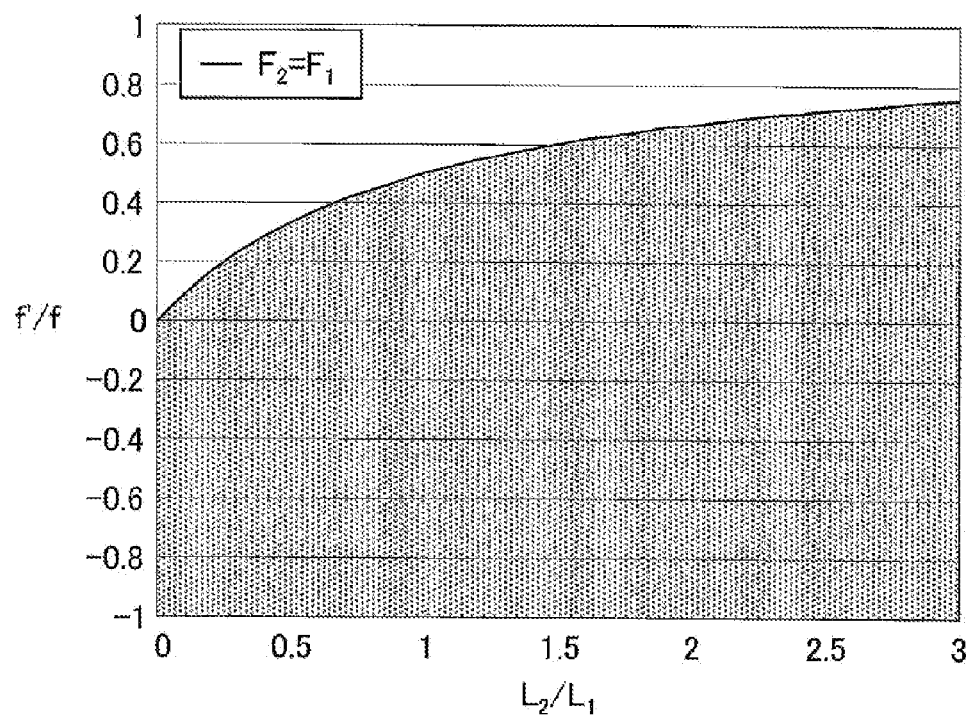
FIG. 10B is a graph showing the condition in which the operation force $F_2$ becomes smaller than the operation force $F_1$.

Referring to FIGS. 10A and 10B it will now be discussed that the operation force $F_2$ is smaller than the operation force $F_1$. FIG. 10A is a graph showing the result of comparing the operation force $F_1$ and the operation force $F_2$ under an arbitrary condition, and FIG. 10B is a graph showing the condition in which the operation force $F_2$ becomes smaller than the operation force $F_1$.

As shown in FIG. 10A, as the ratio of the magnetic force f' with respect to the magnetic force f becomes smaller, as the armature 1 separates from the end 3a, the operation force $F_2$ tends to become smaller than the operation force $F_1$ ($F_2 < F_2$ is easily met) at the arbitrary distances $L_1$, $L_2$. In other words, the required operation force becomes smaller as the armature 1 is further pushed in. As described above, since the operation force $F_2$ is always smaller than the operation force F ($F_2 < F$ is met, see FIG. 7 and the equation 5), it should be recognized that the operation force $F_2$ is smaller than the operation force F even if the operation force $F_2$ becomes greater than the operation force $F_1$ (if $F_2 > F_1$ is met).

The condition in which the operation force $F_2$ becomes smaller than the operation $F_1$ is expressed by the following equation.

$$\frac{f'}{f} < \frac{L_2}{L_1 + L_2} \qquad \text{[Equation 9]}$$

FIG. 10B shows the range satisfying the above inequality where the lower side portion of the curve illustrates $F_2 = F_1$. In one embodiment, the power generation device 10 is preferably designed so that the specification falls within the range shown in FIG. 10B.

Figure 11A:
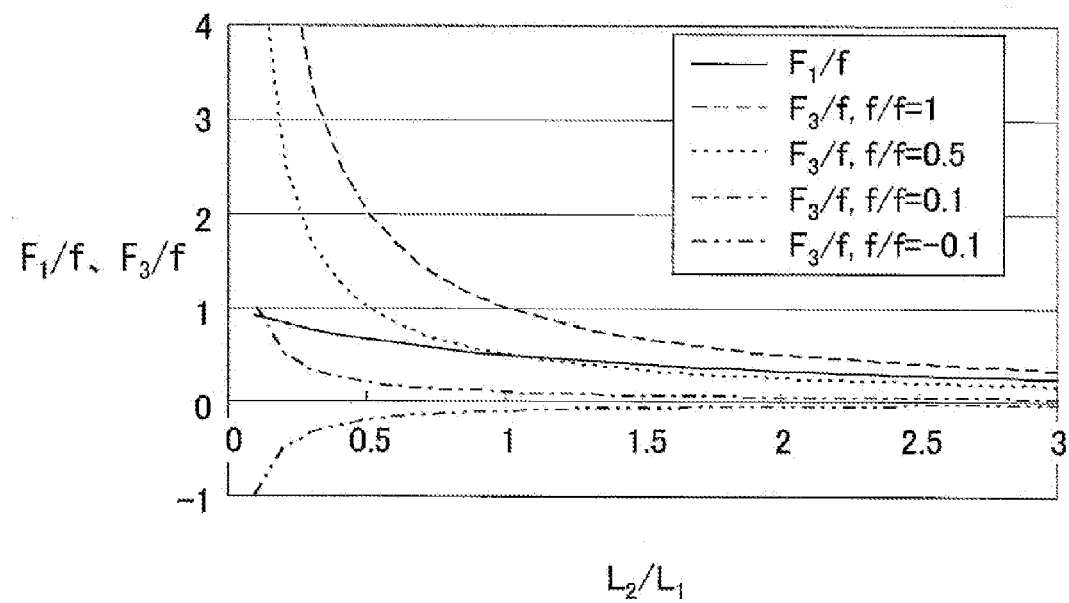
FIG. 11A is a graph showing the result of comparing the operation force $F_1$ and the operation force $F_3$ under an arbitrary condition.
Figure 11B:
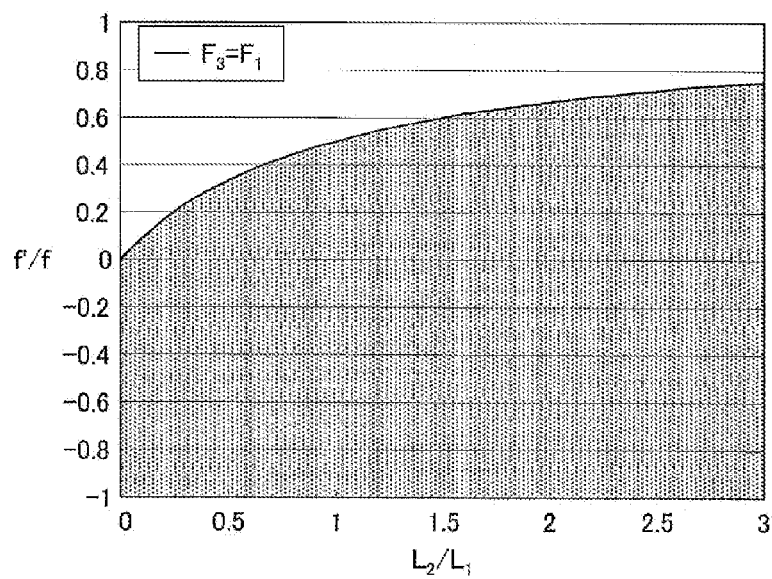
FIG. 11B is a graph showing the condition in which the operation force $F_3$ becomes smaller than the operation force $F_1$.

As discussed herein with regard to FIGS. 11A and 11B, the operation force $F_3$ is smaller than the operation force $F_1$. FIG. 11A is a graph showing the result of comparing the operation force $F_1$ and the operation force $F_3$ under an arbitrary condition, FIG. 11B is a graph showing the condition in which the operation force $F_3$ becomes smaller than the operation force $F_1$.

As shown in FIG. 11A, as the ratio of the magnetic force f' with respect to the magnetic force f becomes smaller, as the armature 1 separates from the end 3a, the operation force $F_3$ tends to become smaller than the operation force $F_1$ ($F_3 < F_1$ is easily met) at the arbitrary distances $L_1$, $L_2$. In other words, the required operation force becomes smaller as the armature 1 is further pushed in, similar to the description made above.

The condition in which the operation force $F_3$ becomes smaller than the operation force $F_1$ is expressed by the following equation.

$$\frac{f'}{f} < \frac{L_2}{L_1 + L_2} \qquad \text{[Equation 10]}$$

As shown in FIG. 11B, the range satisfying the above inequality is shown where the lower side portion of the curved line illustrates $F_3 = F_1$. In one embodiment, the power generation device 10 is preferably designed so that the specification falls within the range shown in FIG. 11B.

Accordingly, when the design of the power generation device 10 satisfies a predetermined condition, the power generation device can reduce the required operation force as the armature 1 rotates. Therefore, the power generation device 10 can generate power at higher power generation efficiency than the conventional power generation device.

Comparison of Operation Force and Power Generation Efficiency

Figure 12:
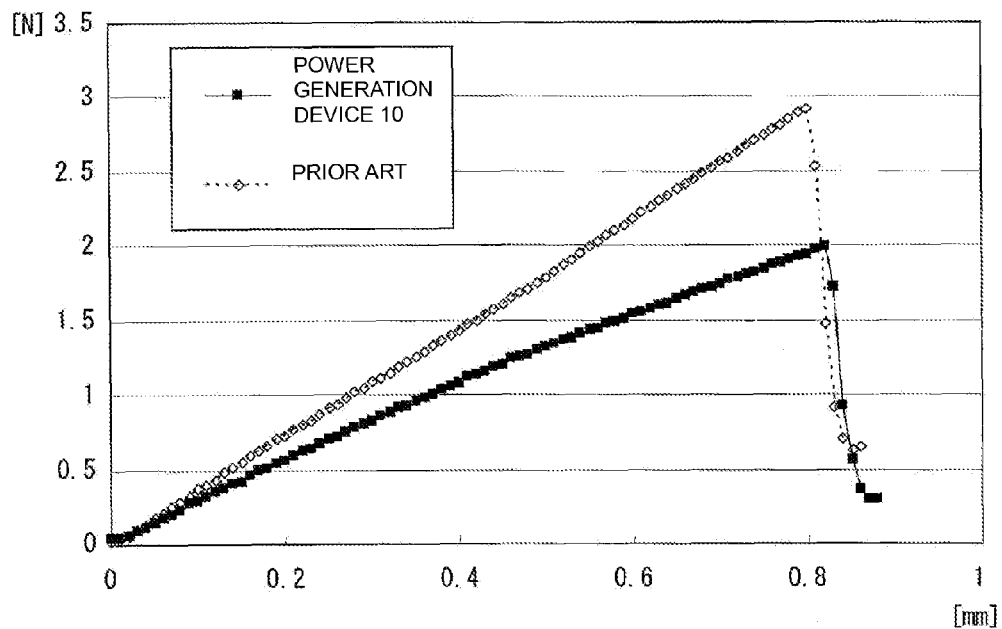
FIG. 12 is a graph showing F-S characteristics of the power generation device and a conventional power generation device.

With reference to FIG. 12, the comparison will now be discussed between the operation force required for the operation of the power generation device 10 and the operation force required for the operation of the conventional power generation device. FIG. 12 is a graph showing F-S characteristics of the power generation device 10 and the conventional power generation device. The horizontal axis of the graph represents the movement amount of the operation position W, and the vertical axis of the graph represents the force applied on the operation position.

If the moment generated by the operation force $F_1$ is smaller than the moment by the magnetic force of the end 3 or is balanced with such moment, the armature 1 does not rotate, and the energy by the operation force is accumulated in the spring as the spring 4 having elasticity deflects. If the moment generated by the operation force $F_1$ becomes greater than the moment by the magnetic force of the end 3, the armature 1 rotates. In this case, the armature 1 accelerates the rotation by the energy accumulated in the spring 4.

As shown in FIG. 12, the operation force $F_1$ linearly increases in the former case over the range of 0 to 0.8 represented in the horizontal axis of the graph. In the latter case, the armature 1 separates from the end 3 and rotates, and a small amount of operation forces $F_2$ and $F_3$ are instantaneously measured in range of 0.8 to 1.0 of the horizontal axis of the graph. Thus, the operation force $F_1$ (i.e., the height of the vertex of the graph) dominantly influences the overall operation force ($F_1 + F_2 + F_3$) in the operation of the power generation device 10.

The conventional power generation device requires the operation force F of 3N, whereas the power generation device 10 merely requires the operation force $F_1$ of 2N. In other words, the power generation device 10 can generate power with the operation force of smaller than or equal to 70 percent of that in the related art. In other words, the power generation device 10 can generate power with a simple operation involved in the daily performance without giving a sense of discomfort to the user or without the user being conscious of strongly pushing in the spring 4, as opposed to the conventional power generation device.

Figure 13:
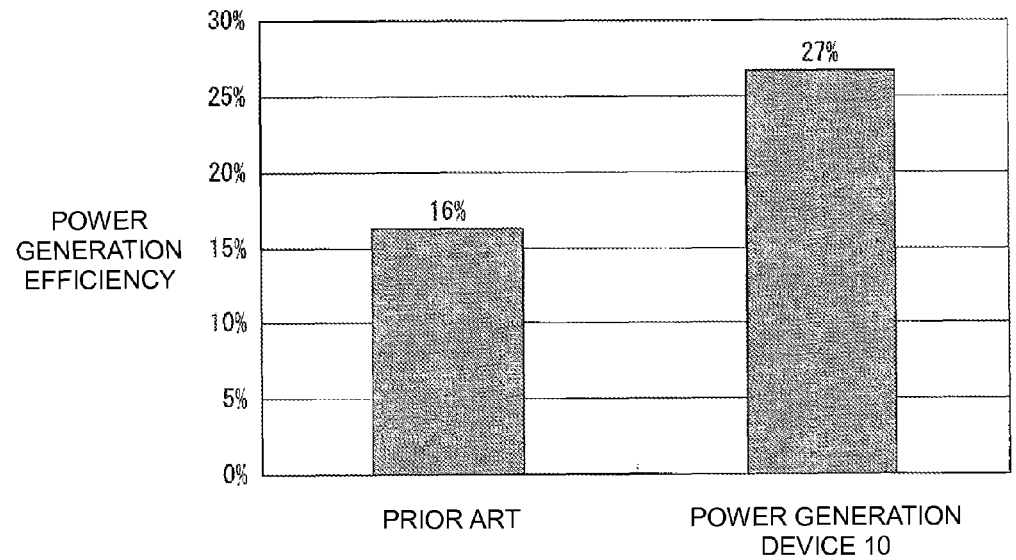
FIG. 13 is a graph showing power generation efficiency of the power generation device and the conventional power generation device.

A comparison of the power generation efficiency of the power generation device 10 and the power generation efficiency of the conventional power generation device will be described based on FIG. 13. FIG. 13 is a graph showing the power generation efficiency (i.e., the ratio of the power generation amount with respect to the energy accumulated in the spring 4) of the power generation device 10 and the conventional power generation device.

As shown in FIG. 13, the power generation efficiency of the conventional power generation device is only about 16%, whereas the power generation efficiency of the power generation device 10 reaches to above 27%. In other words, the power generation device 10 can improve the power generation efficiency of the conventional power generation device by 1.6 times. The power generation device 10 can suppress the operation force to lower than or equal to 70% of that in the related art while maintaining the power generation amount that can be generated by the conventional power generation device. Thus, the power generation device 10 can generate power at higher power generation efficiency than the conventional power generation device.

Other Shapes of Protrusion 8a and Protrusion 8b

Figure 14A:
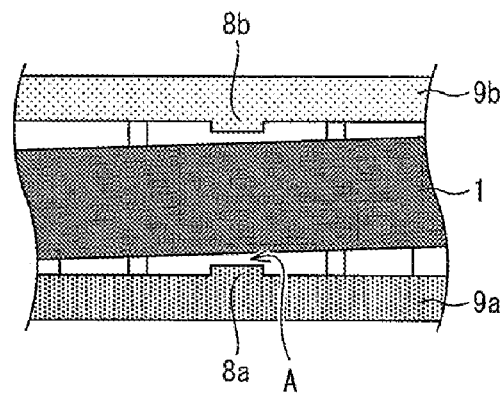
FIGS. 14A to 14C show variations of the modes of protrusions, where
Figure 14B:
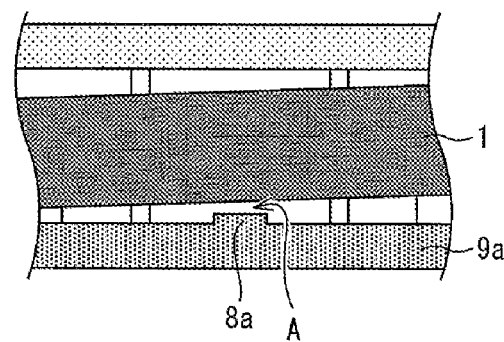
Figure 14C:
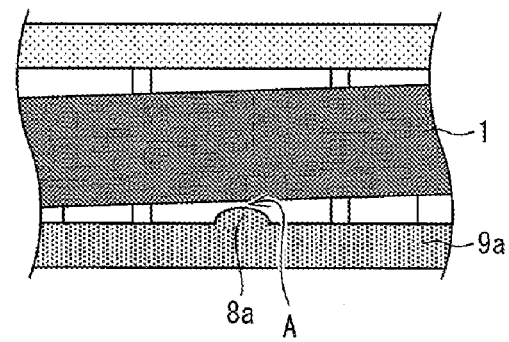

Other modes and structures of the protrusion 8a and the protrusion 8b will be described based on FIGS. 14A to 17B. FIGS. 14A to 14C show variations of the modes of the protrusion 8a and the protrusion 8b. FIG. 14A is a cross-sectional view showing a case where the rectangular protrusion 8a and the rectangular protrusion 8b are respectively arranged on the spool 9b and the spool 9a; FIG. 14B is a cross-sectional view showing a case where only the rectangular protrusion 8a is arranged on the spool 9a; and FIG. 14C is a cross-sectional view showing a case where the protrusion 8a with smoothened edge is arranged on the spool 9a.

As shown in FIG. 14A, the shape of the protrusion 8a and the protrusion 8b may be a rectangle. The power generation device 10 can be simply manufactured since additional processing is not necessary.

As shown in FIG. 14B, if the operation forces $F_1$ to $F_3$ are constantly applied downward in the perpendicular direction (direction of pushing down the spring 4), the protrusion 8b does not need to be arranged. Since further processing is not necessary, the power generation device 10 can be more simply manufactured, and furthermore, the manufacturing cost can be reduced.

As shown in FIG. 14C, the area at which the armature 1 and the protrusion 8a make contact with each other can be made constant by smoothening the edge of the protrusion 8a. In other words, a situation can be avoided in which a load is intensively applied to only a specific portion of the armature 1 at a certain instant. Therefore, the shape of the protrusion 8a with smoothened edge can enhance the durability of the armature 1, and extend the durable years of the power generation device 10.

Figure 15A:
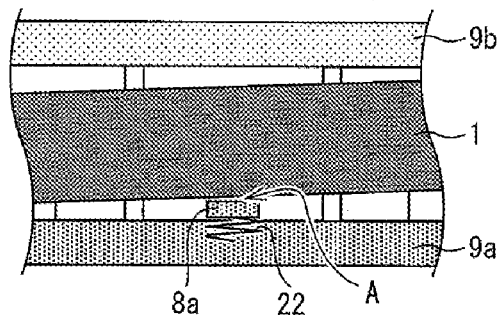
FIGS. 15A to 15C show a structure in which a shaft is supported by an elastic member that exerts stress, where
Figure 15B:
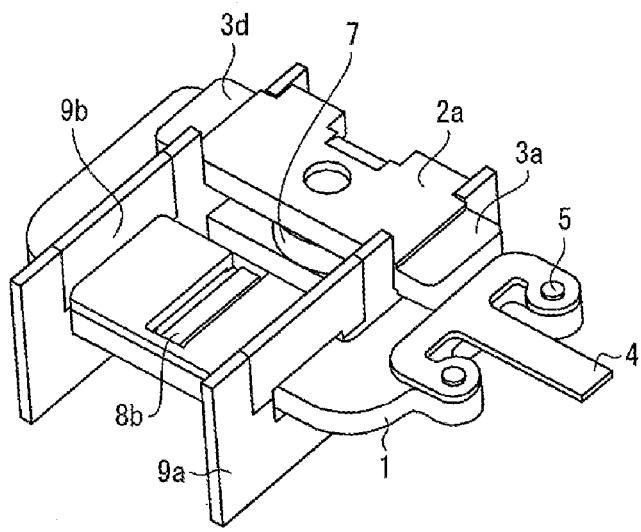
Figure 15C:
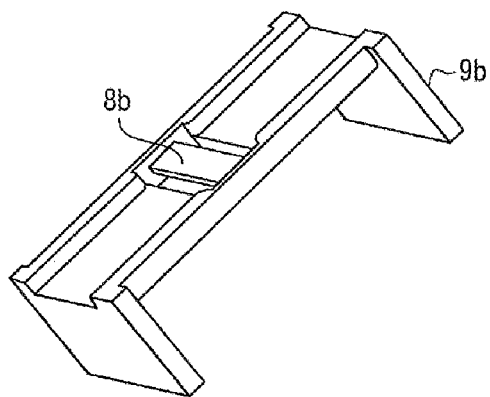

FIGS. 15A to 15C show a structure in which the protrusion 8a is supported by an elastic member that exerts stress. FIG. 15A is a cross-sectional view showing a state in which the elastic member supports the protrusion 8a; FIG. 15B is a bird's eye view of the power generation device 10 where the coil 6 is not shown; and FIG. 15C is a schematic view showing a structure of the spool 9b.

As shown in FIG. 15A, the protrusion 8a may be supported by a spring (elastic member) 22. In this structure, the armature 1 is pushed up by the stress of the spring 22 when the power generation device 10 transitions from the third state to the fourth state, thus accelerating the rotation of the armature 1. Therefore, the operation force $F_3$ may be further reduced, whereby the structure can further improve the power generation efficiency of the power generation device 10. Note that only the protrusion 8a is arranged on the spool 9a in the structure shown in FIG. 15A, but the protrusion 8b may be arranged on the spool 9b and may or may not be supported by a spring similar to the spring 22.

As shown in FIGS. 15B and 15C, an installing portion of the protrusion 8b (or the protrusion 8a) may have a structure that can deflect up and down. The stress of the spring 22 is thereby further strengthened, and the structure can further improve the power generation efficiency of the power generation device 10.

Figure 16A:
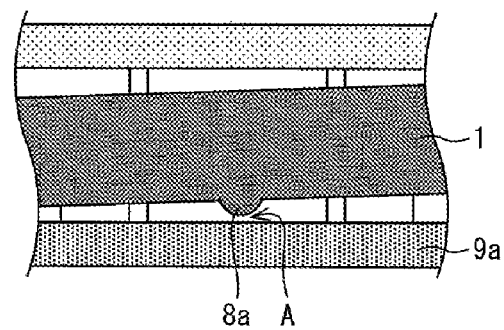
FIGS. 16A and 16B are views showing a structure in which the protrusion is arranged in the armature, where
Figure 16B:
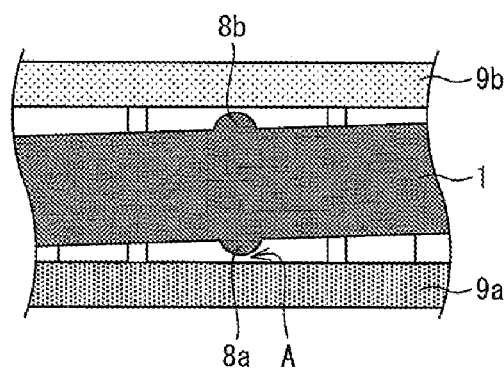

FIGS. 16A and 16B are views showing a structure in which the protrusion is arranged in the armature 1, where FIG. 16A is a cross-sectional view showing a structure in which the protrusion 8a is arranged only on the lower side of the armature 1, and FIG. 16B is a cross-sectional view showing a structure in which the protrusion 8a and the protrusion 8b are respectively arranged on both sides of the armature 1.

As shown in FIG. 16A, a structure in which the protrusion 8a is arranged in the armature 1 may be adopted. The structure obtains effects similar to the structure in which the protrusion 8a is arranged on the spool 9a. Furthermore, a hard, soft magnetic material may be used for the protrusion 8a, in which case, the strength can be enhanced.

As shown in FIG. 16B, the protrusion 8a and the protrusion 8b may be arranged on both sides of the armature 1. Thus, the risk can be avoided in which the armature 1 is attracted to both ends of one yoke and the armature 1 cannot rotate. Furthermore, the power generation device 10 can generate power not only when the operation position W is pushed down but also when the operation position W is pushed up.

Figure 17A:
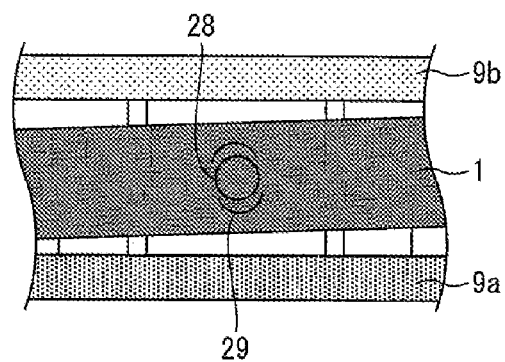
FIG. 17A is a cross-sectional view showing a structure in which a round shaft arranged on a side surface of the armature is supported by a bearing of a long hole.
Figure 17B:
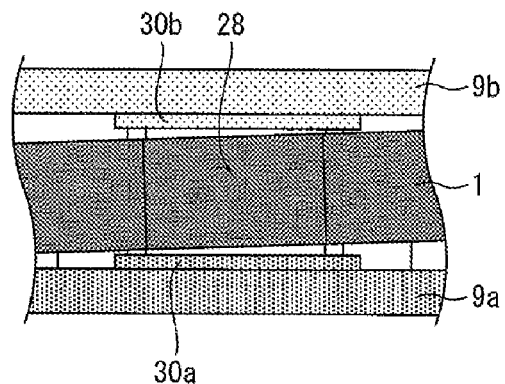
FIG. 17B is a cross-sectional view showing a structure in which a square shaft arranged on a side surface of the armature is supported by protrusions respectively arranged on the spool and the spool.

FIG. 17A is a cross-sectional view showing a structure in which a round shaft 28 arranged on a side surface of the armature 1 is supported by a bearing 29 of a long hole, and FIG. 17B is a cross-sectional view showing a structure in which a square shaft 28 arranged on a side surface of the armature 1 is supported by a protrusion 30a and a protrusion 30b respectively arranged on the spool 9a and the spool 9b.

As shown in FIG. 17A, in the above structure, the shaft 28 arranged in the armature 1 is fitted into a vertically long hole 29 so that the shaft 28 moves up and down in the long hole 29. Accordingly, the above structure obtains effects similar to the structure in which the protrusion 8a is arranged on the spool 9a.

As shown in FIG. 17B, in the above structure, a planar portion of the spool receives the load such that the armature 1 is supported by the shaft 28 at a wide area. Therefore, the above structure can enhance the durability of the armature 1, and extend the durable years of the power generation device 10.

Operation of Yoke 2 and Permanent Magnet 7

Figure 18A:
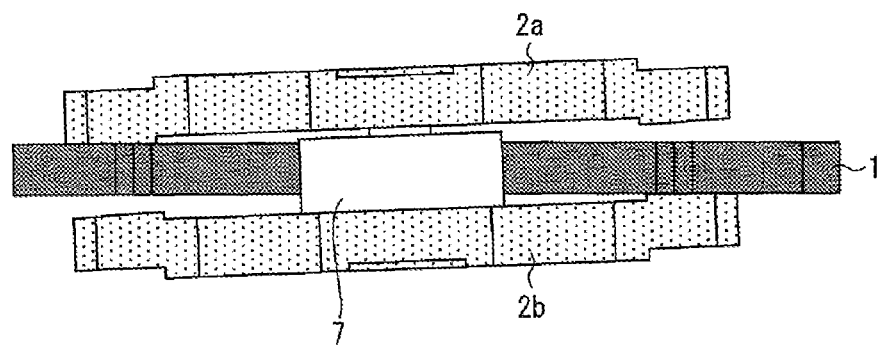
FIGS. 18A and 18B show a process in which yokes and a permanent magnet rotate, where
Figure 18B:
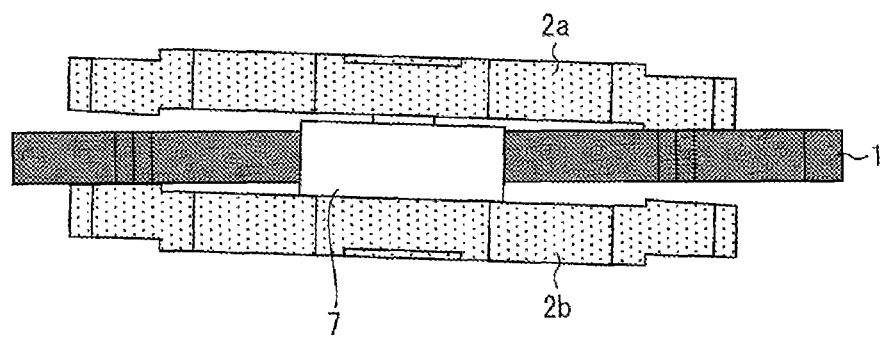

An embodiment in which the yoke 2a and the yoke 2b, and the permanent magnet 7 rotate instead of the armature 1 will be described based on FIGS. 18A and 18B. FIGS. 18A and 18B show a process in which the yoke 2a and the yoke 2b, and the permanent magnet 7 rotate, where FIG. 18A is a cross-sectional view showing an internal structure of the power generation device 10 when the power generation device 10 is in the first state, and FIG. 18B is a cross-sectional view showing the internal structure of the power generation device 10 when the power generation device 10 is in the fourth state.

As shown in FIGS. 18A and 18B, the power generation device 10 may have a configuration in which the yoke 2a, the yoke 2b, and the permanent magnet 7 rotate instead of the armature 1. In such a structure, the space at an interior of the bobbin partitioned by the spool 9a and the spool 9b does not need to be ensured for the armature 1 to rotate, and hence the coil 6 can be miniaturized.

Application Example of Power Generation Device 10

Figure 19A:
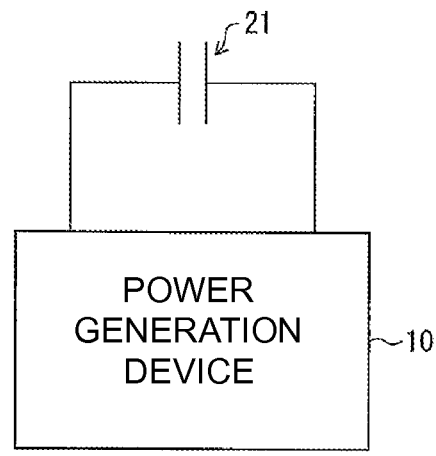
FIGS. 19A and 19B show electric machinery and apparatus that uses the power generated by the power generation device, where
Figure 19B:
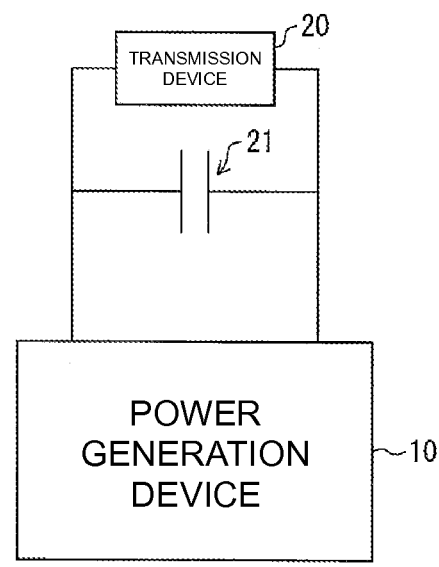

An application example of the power generation device 10 will be described based on FIGS. 19A and 19B. FIGS. 19A and 19B show electric machinery and apparatus that uses power generated by the power generation device 10. FIG. 19A is a circuit diagram showing a connection of a capacitor 21 to the power generation device 10, and FIG. 19B is a circuit diagram showing a connection of the capacitor 21 and a transmission device 20 to the power generation device 10.

As shown in FIG. 19A, when the capacitor 21 is connected to the power generation device 10, the power generated by the power generation device can be accumulated in the capacitor.

As shown in FIG. 19B, the transmission device 20 that transmits radio, infrared light, and the like to an external device using the power generated by the power generation device 10 may be connected. In other words, the power generation device 10 can operate the transmission device 20 that requires instantaneous power for a simple operation of transmitting radio, infrared light, and the like without using a power source such as a battery.

Figure 20A:
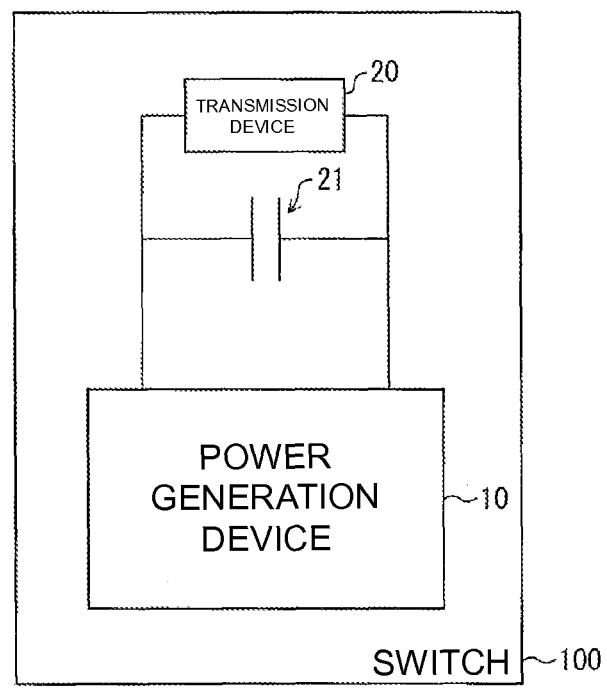
FIGS. 20A and 20B show electric machinery and apparatus that uses power generated by the power generation device, where
Figure 20B:
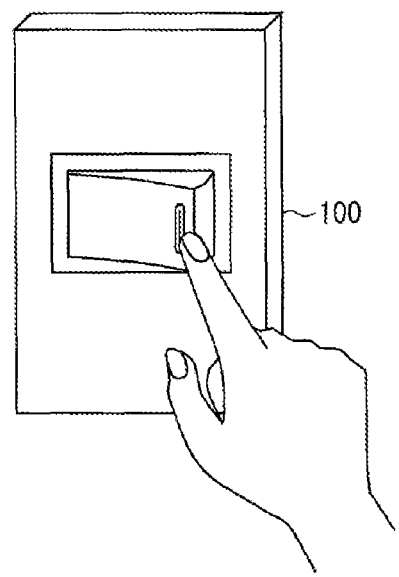

A more specific application example of the power generation device 10 will be described based on FIGS. 20A and 20B. FIGS. 20A and 20B show electric machinery and apparatus that uses power generated by the power generation device 10. FIG. 20A is a schematic view showing a switch 100 including the power generation device 10, the capacitor 21, and the transmission device 20, and FIG. 20B is a schematic view showing a usage scene of the switch 100.

As shown in FIG. 20A, the switch 100 includes the power generation device 10 and the capacitor 21, and is designed to be able to rotate the armature 1 of the power generation device 10 when the user pushes the switch 100.

As shown in FIG. 20B, for example, the switch 100 can be applied to a device for turning ON/OFF an indoor illumination device (fluorescent lamp or the like in the room). Conventionally, such and ON/OFF switch is generally installed at the wall surface of the room, and the wiring connecting the switch and the indoor illumination device is embedded in the wall surface.

However, according to the switch 100, the wiring does not need to be embedded in the wall surface as long as the indoor illumination device includes a device that can receive the signal transmitted by the transmission device 20. The power generation device 10 generates power by a daily operation of the user pushing the switch 100, and the transmission device 20 transmits a wireless signal to the indoor illumination device using the generated power, so that the indoor illumination device can be turned ON/OFF. Therefore, the switch 100 does not require construction work to embed the wiring. Thus, the switch 100 can reduce the cost required for the construction work, and furthermore, enables a free indoor layout that is not inhibited by the wiring.

Accordingly, a wide variety of applications can be expected on the power generation device 10. In other words, the application of the power generation device 10 is not limited to the application example described with reference to FIGS. 19A and 19B and FIGS. 20A and 20B, and application can be made to various other applications.

Effects Obtained by Power Generation Device 10

As described with reference to FIGS. 1 to 20B, the power generation device 10 can generate power with a smaller operation force than the operation force required in the conventional power generation device by a simple mechanism without enlarging the device or extending the operation stroke. The power generation device 10 can generate power of the same amount as the power that can be generated by the conventional power generation device, and thus the power generation device 10 capable of generating power with a smaller operation force than the related art has an effect of being able to generate power at higher power generation efficiency than the conventional power generation device.

The present invention can be widely applied to a power generation device and the like for inducing current to the coil by the principle of electromagnetic induction.

A power generation device is described herein according to one aspect of the present invention as relating to (1) a power generation device including a rotation member configured to rotate with a predetermined position as a supporting point by an externally applied operation force; and a supporting member configured to support the rotation member by attracting the rotation member with a magnetic force exerted at a predetermined portion, the power generation device configured to induce a current to a coil by causing a magnetic flux of a permanent magnet passing through the coil to fluctuate in cooperation with the rotation of the rotation member, wherein (2) when the operation force is applied in a first state in which the rotation member is supported by the supporting member by being attracted to a first portion and a second portion of the supporting member at a first position and a second position, the rotation member transitions to a second state by rotating with the first position as a first supporting point, and further transitions to a third state by rotating with a position different from the first position as a second supporting point.

As described above, in the conventional power generation device, the rotation member rotates with the central part thereof (portion between two protrusions) as the exclusive supporting point, and thus the operation force has to simultaneously act on the respective positions where the rotation member is attracted to the two ends. Thus, the conventional power generation device requires an operation force greater than the sum of the magnetic forces by the two ends, which may give a sense of discomfort to the user or may cause the user to be conscious of operating strongly.

On the other hand, in the power generation device according to one aspect of the present invention, the rotation member transitions to the second state by rotating with the first position as the first supporting point when the operation force is applied in the first state. In other words, in the transition from the first state to the second state, the operation force acts only on the second position and thus the operation force merely needs to be a magnitude greater than the magnetic force by the second portion in the supporting member.

Thereafter, the rotation member transitions to the third state by rotating with the position different from the first position as the second supporting point. In other words, in the transition from the second state to the third state, the operation force acts only on the first position and thus the operation force merely needs to be a magnitude greater than the magnetic force by the first portion. That is, the power generation device according to one aspect of the present invention does not require the operation force greater than the sum of the magnetic forces all at once as in the conventional power generation device, and requires only the operation force greater than the respective magnetic forces in order (with time difference).

Therefore, the power generation device according to one aspect of the present invention can generate power with an operation force smaller than the operation force required in the conventional power generation device with a simple mechanism without enlarging the device or extending the operation stroke. The power generation device according to one aspect of the present invention can generate power of the same amount as the power that can be generated by the conventional power generation device, and thus can generate power at higher power generation efficiency than the conventional power generation device.

In the power generation device according to one aspect of the present invention, (1) when supported by the supporting member with a space provided between the rotation member and a position to become the second supporting point in the first state, the rotation member may rotate with the first position as the first supporting point, and then rotate with the position different from the first position as the second supporting point, and (2) by the rotation, the rotation member may transition to the second state by acting the operation force on the second position in the first state, and then transition to the third state by acting the operation force on the first position.

As described above, the conventional power generation device requires the operation force greater than the sum of the magnetic forces by the two ends. Since the rotation member rotates with the central part thereof (portion between two protrusions) as the exclusive supporting point, the operation force has to simultaneously act on the respective positions where the rotation member is attracted to the two ends.

On the other hand, in the power generation device according to one aspect of the present invention, the rotation member and the position to become the second supporting point (e.g., central part of the rotation member) are not in contact with each other, and the rotation member is supported by the supporting member with a space provided between the rotation member and the position to become the second supporting point.

Thus, after the rotation member rotates with the first position as the first supporting point so that the operation force acts on the second position (transition from the first state to the second state), the rotation member rotates with the position different from the first position as the second supporting point (transition from the second state to the third state). In other words, the power generation device according to one aspect of the present invention interchanges the supporting point of the rotation according to the position (the first position, the second position) to act the operation force without fixing the supporting point about which the rotation member rotates as in the conventional power generation device. Thus, the power generation device according to one aspect of the present invention does not require the operation force greater than the sum of the magnetic forces all at once as in the conventional power generation device, and requires only the operation force greater than the respective magnetic forces in order (with time difference).

Therefore, the power generation device according to one aspect of the present invention can generate power with an operation force smaller than the operation force required in the conventional power generation device with a simple mechanism without enlarging the device or extending the operation stroke. The power generation device according to one aspect of the present invention thus can generate power of the same amount as the power that can be generated by the conventional power generation device, and hence can generate power at higher power generation efficiency than the conventional power generation device.

In the power generation device according to one aspect of the present invention, (1) when the rotation member further rotates in the third state, the rotation member may further transition to a fourth state in which the rotation member is supported by the supporting member by being attracted to a third portion and a fourth portion in the supporting member at a third position and a fourth position with a space provided between the rotation member and the position to become the second supporting point.

In the power generation device according to one aspect of the present invention, when the rotation member further rotates from the third state, the rotation member is supported by the supporting member in an orientation of being attracted to the third portion and the fourth portion in the supporting member (fourth state). In this case as well, the rotation member and the position to become the second supporting point (e.g., central part of the rotation member) are not in contact with each other, and the rotation member is supported with a space provided between the rotation member and the position to become the second supporting point. Thus, when the power generation device according to one aspect of the present invention transitions from the fourth state to the first state through the third state and the second state, the power generation device can interchange the supporting point of the rotation according to the position to act the operation force without fixing the supporting point about which the rotation member rotates as in the conventional power generation device.

In other words, the power generation device according to one aspect of the present invention does not require the operation force greater than the sum of the magnetic forces all at once as in the conventional power generation device, and requires only the operation force greater than the respective magnetic forces in order (with time difference). Therefore, the power generation device according to one aspect of the present invention can generate power at higher power generation efficiency than in the related art with a simple mechanism without enlarging the device or extending the operation stroke.

In the power generation device according to one aspect of the present invention, (1) a distance from the first position to a position to apply the operation force may be longer than a distance from the position to become the second supporting point to the position to apply the operation force.

As described above, the power generation device according to one aspect of the present invention does not require the operation force greater than the sum of the magnetic forces all at once as in the conventional power generation device, and requires only the operation force greater than the respective magnetic forces in order (with time difference). In this case, the distance from the first supporting point to the position (force point) to apply the operation force is longer than the distance from the position to become the second supporting point to the operation position, and thus the operation force acts on the second position with the principle of leverage acting more advantageously than in the convention power generation device having the central part of the rotation member as the exclusive supporting point.

Therefore, the power generation device can generate power with an operation force smaller than the operation force required in the conventional power generation device, and hence can generate power at higher power generation efficiency than in the conventional power generation device.

In the power generation device according to one aspect of the present invention, (1) the rotation member may rotate with a protrusion as the second supporting point, the protrusion being arranged at a predetermined position of a fixing member configured to fix the supporting member.

In other words, after the rotation member rotates with the first position as the first supporting point so that the operation force acts on the second position, the rotation member rotates with the position different from the first position as the second supporting point. In other words, the power generation device according to one aspect of the present invention interchanges the supporting point of the rotation according to the position to act the operation force without fixing the supporting point about which the rotation member rotates as in the conventional power generation device. Therefore, the power generation device according to one aspect of the present invention can generate power at higher power generation efficiency than in the related art with a simple mechanism without enlarging the device or extending the operation stroke.

By way of example, the protrusion may be a rectangle. The power generation device described above can be easily manufactured since only simple processing is necessary (additional processing is not necessary). As another example, the protrusion may have a shape in which the rectangular edge is cut off. The area at which the rotation member and the protrusion make contact thus becomes constant, and a situation can be avoided in which the load is intensively applied to only a specific portion of the rotation member. Therefore, the shape of the protrusion with smoothened edge can enhance the durability of the rotation member and extend the durable years of the power generation device.

In the power generation device according to one aspect of the present invention, (1) the protrusion arranged at the predetermined position of the fixing member may be supported by an elastic member that exerts stress.

Thus, when the power generation device transitions the state of the operation, the stress of the elastic member accelerates the rotation of the rotation member. Therefore, the power generation device can generate power with an operation force smaller than the operation force required in the conventional power generation device, and hence can generate power at higher power generation efficiency than the conventional power generation device.

The fixing member to which the protrusion is arranged may have a configuration that can deflect up and down. Thus, the stress of the elastic member is further strengthened, and the structure can further improve the power generation efficiency of the power generation device.

A transmission device according to another aspect of the present invention (1) is configured to transmit signals to an external device using power generated by the power generation device described above.

In other words, the transmission device according to another aspect of the present invention is electrically connected with the power generation device, and the power required when transmitting the signal to the external device is provided by the power generated by the power generation device. Therefore, the transmission device according to another aspect of the present invention can transmit signals without mounting a power source such as a battery.

A switching device according to still another aspect of the present invention relates to (1) a switching device configured to switch states of an external device, (2) the switching device including the power generation device described above; and (3) the transmission device described above.

The switching device according to still another aspect of the present invention can cause the transmission device to transmit signals to the external device using the power generated by the power generation device and cause the external device to receive the signals to switch the state of the external device without mounting the power source such as the battery. Thus, the wiring for connecting the switching device according to still another aspect of the present invention and the external device is not necessary, and the switching device can resolve all the demerits associated with the arrangement of the wiring.

For example, the switching device can be applied as a device (electrical switch or the like) for switching ON/OFF of the external device such as the indoor illumination device. In this case, the wiring for connecting the switching device and the indoor illumination device does not need to be embedded in the wall surface, and thus the switching device not only reduces the cost, but also enables a free indoor layout that is not inhibited by the wiring.

According to the power generation device of one aspect of the present invention, when the operation force is applied in the first state in which the rotation member is supported by the supporting member by being attracted to the first portion and the second portion in the supporting member at the first position and the second position, the rotation member rotates with the first position as the first supporting point to transition to the second state, and rotates with the position different from the first position as the second supporting point to further transition to the third state.

Therefore, the power generation device according to one aspect of the present invention has an effect of being able to generate power at higher power generation efficiency than in the related art with a simple mechanism without enlarging the device or extending the operation stroke.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A power generation device comprising:
    a rotation member configured to rotate with a predetermined position as a supporting point by an externally applied operation force; and
    a supporting member configured to support the rotation member by attracting the rotation member with a magnetic force exerted at a predetermined portion of the supporting member,
    wherein the power generation device is configured to induce a current to a coil by causing a magnetic flux of a permanent magnet passing through the coil to fluctuate in cooperation with the rotation of the rotation member, and
    wherein when the operation force is applied in a first state in which the rotation member is supported by the supporting member by being attracted to a first portion and to a second portion of the supporting member at a first position and a second position, the rotation member transitions to a second state by rotating with the first position of the supporting member as a first supporting point, and further transitions to a third state by rotating with a position of the supporting member different from the first position as a second supporting point.

2. The power generation device according to claim 1, wherein
    when supported by the supporting member with a space provided between the rotation member and a position to become the second supporting point in the first state, the rotation member rotates with the first position as the first supporting point, and then rotates with the position different from the first position as the second supporting point, and
    by the rotation, the rotation member transitions to the second state by acting the operation force on the second position in the first state, and then transitions to the third state by acting the operation force on the first position.

3. The power generation device according to claim 2, wherein
    when the rotation member further rotates in the third state, the rotation member further transitions to a fourth state in which the rotation member is supported by the supporting member by being attracted to a third portion and a fourth portion of the supporting member at a respective third position and a fourth position with a space provided between the rotation member and the position to become the second supporting point.

4. The power generation device according to claim 3, wherein a distance from the first position to a position to apply the operation force is longer than a distance from the position to become the second supporting point to the position to apply the operation force.

5. The power generation device according to claim 4, wherein the rotation member rotates with a protrusion as the second supporting point, the protrusion being arranged at a predetermined position of a fixing member configured to fix the supporting member.

6. The power generation device according to claim 3, wherein the rotation member rotates with a protrusion as the second supporting point, the protrusion being arranged at a predetermined position of a fixing member configured to fix the supporting member.

7. The power generation device according to claim 2, wherein a distance from the first position to a position to apply the operation force is longer than a distance from the position to become the second supporting point to the position to apply the operation force.

8. The power generation device according to claim 7, wherein the rotation member rotates with a protrusion as the second supporting point, the protrusion being arranged at a predetermined position of a fixing member configured to fix the supporting member.

9. The power generation device according to claim 2, wherein the rotation member rotates with a protrusion as the second supporting point, the protrusion being arranged at a predetermined position of a fixing member configured to fix the supporting member.

10. The power generation device according to claim 9, wherein the protrusion arranged at the predetermined position of the fixing member is supported by an elastic member that exerts stress.

11. The power generation device according to claim 1, wherein
when the rotation member further rotates in the third state, the rotation member further transitions to a fourth state in which the rotation member is supported by the supporting member by being attracted to a third portion and a fourth portion of the supporting member at a respective third position and a fourth position with a space provided between the rotation member and the position to become the second supporting point.

12. The power generation device according to claim 11, wherein a distance from the first position to a position to apply the operation force is longer than a distance from the position to become the second supporting point to the position to apply the operation force.

13. The power generation device according to claim 12, wherein the rotation member rotates with a protrusion as the second supporting point, the protrusion being arranged at a predetermined position of a fixing member configured to fix the supporting member.

14. The power generation device according to claim 11, wherein the rotation member rotates with a protrusion as the second supporting point, the protrusion being arranged at a predetermined position of a fixing member configured to fix the supporting member.

15. The power generation device according to claim 1, wherein a distance from the first position to a position to apply the operation force is longer than a distance from the position to become the second supporting point to the position to apply the operation force.

16. The power generation device according to claim 15, wherein the rotation member rotates with a protrusion as the second supporting point, the protrusion being arranged at a predetermined position of a fixing member configured to fix the supporting member.

17. The power generation device according to claim 1, wherein the rotation member rotates with a protrusion as the second supporting point, the protrusion being arranged at a predetermined position of a fixing member configured to fix the supporting member.

18. The power generation device according to claim 17, wherein the protrusion arranged at the predetermined position of the fixing member is supported by an elastic member that exerts stress.

19. A transmission device configured to transmit signals to an external device using power generated by the power generation device according to claim 1.

20. A switching device configured to switch states of an external device, the switching device comprising:
the power generation device according to claim 1; and
a transmission device configured to transmit signals to an external device using power generated by the power generation device.

* * * * *